(12) United States Patent
Byun

(10) Patent No.: US 7,832,542 B2
(45) Date of Patent: Nov. 16, 2010

(54) REVERSE INPUT PREVENT CLUTCH BEARING ASSEMBLY

(76) Inventor: Donghwan Byun, 205-202 Shinbanpo 4th Apt., Jamwon-dong, Seocho-gu, Seoul (KR) 137-949

( * ) Notice: Subject to any disclaimer, the term of this patent is extended or adjusted under 35 U.S.C. 154(b) by 506 days.

(21) Appl. No.: 11/910,954

(22) PCT Filed: Apr. 7, 2006

(86) PCT No.: PCT/KR2006/001288

§ 371 (c)(1),
(2), (4) Date: Oct. 8, 2007

(87) PCT Pub. No.: WO2006/115343

PCT Pub. Date: Nov. 2, 2006

(65) Prior Publication Data

US 2008/0179156 A1    Jul. 31, 2008

(51) Int. Cl.
*F16D 15/00*    (2006.01)
*F16D 41/064*    (2006.01)
(52) U.S. Cl. ............. 192/223.2; 192/38; 192/44
(58) Field of Classification Search ............. 192/223.2, 192/38
See application file for complete search history.

(56) References Cited

U.S. PATENT DOCUMENTS

| 4,047,601 | A | * | 9/1977 | Fogelberg et al. | ............. 192/36 |
| 5,279,400 | A | | 1/1994 | Riggle et al. | |
| 6,471,023 | B2 | | 10/2002 | Nagaya et al. | |
| 6,695,118 | B2 | * | 2/2004 | Kurita et al. | ............. 192/223.2 |
| 6,871,735 | B2 | * | 3/2005 | Kawai et al. | ............. 192/38 |

FOREIGN PATENT DOCUMENTS

| JP | 2002-266902 | 9/2002 |
| JP | 2003-120715 | 4/2003 |

\* cited by examiner

*Primary Examiner*—Richard M. Lorence
(74) *Attorney, Agent, or Firm*—IPLA P.A.; James E. Bame

(57) ABSTRACT

A reverse input prevention clutch bearing assembly comprises a first rotational member and a second rotational member which are arranged on a coaxial line and has orbit surfaces with different radii and a plurality of rolling members between the two orbit surfaces. The assembly also has a cage which supports the rolling members, and a distinguished wedge ring assembly which allows or does not allow the rolling members to rotate based on the change of the rotational direction gap between the first rotational member and the control member and the rotational direction of the control member.

20 Claims, 11 Drawing Sheets

[Figure 2]
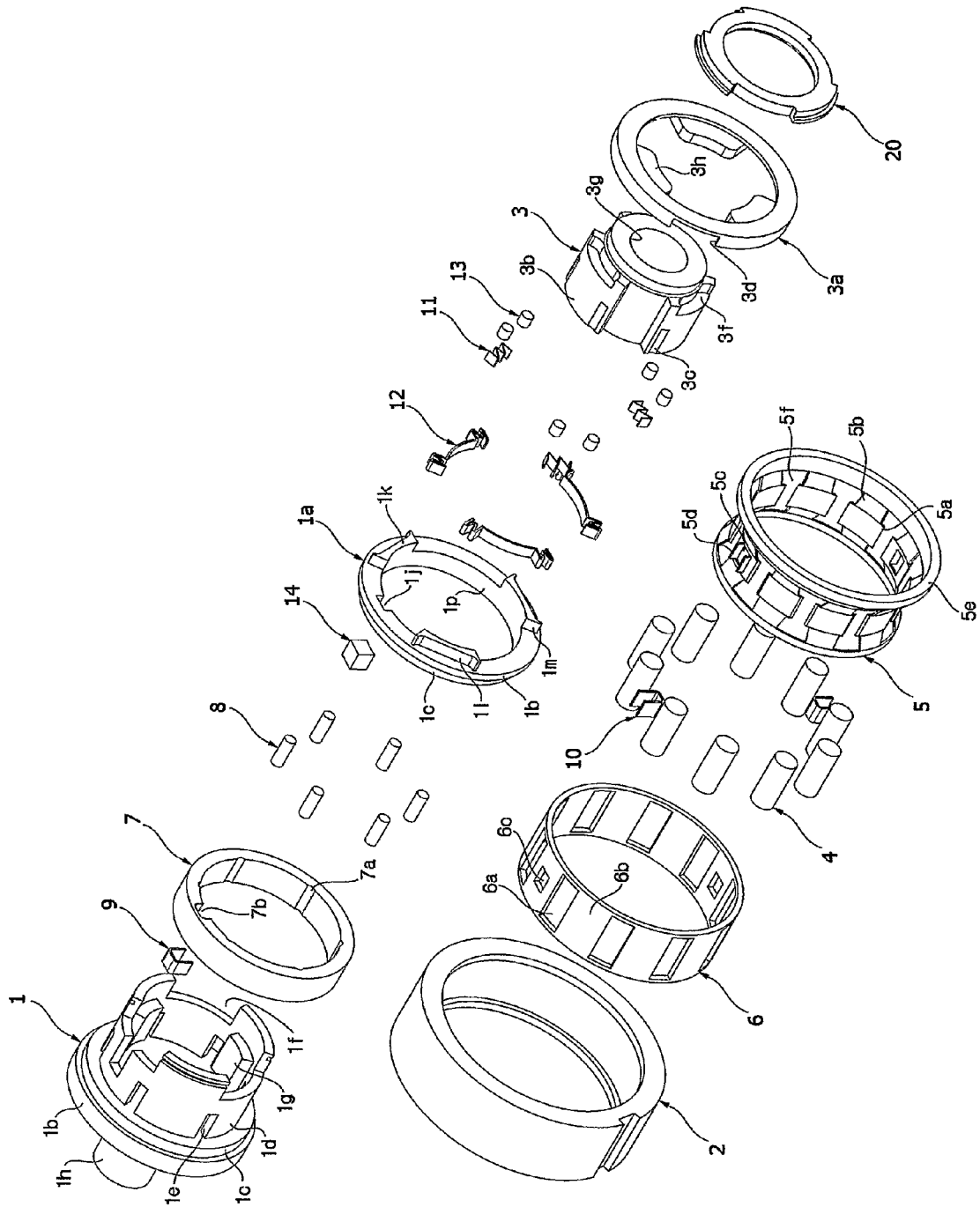

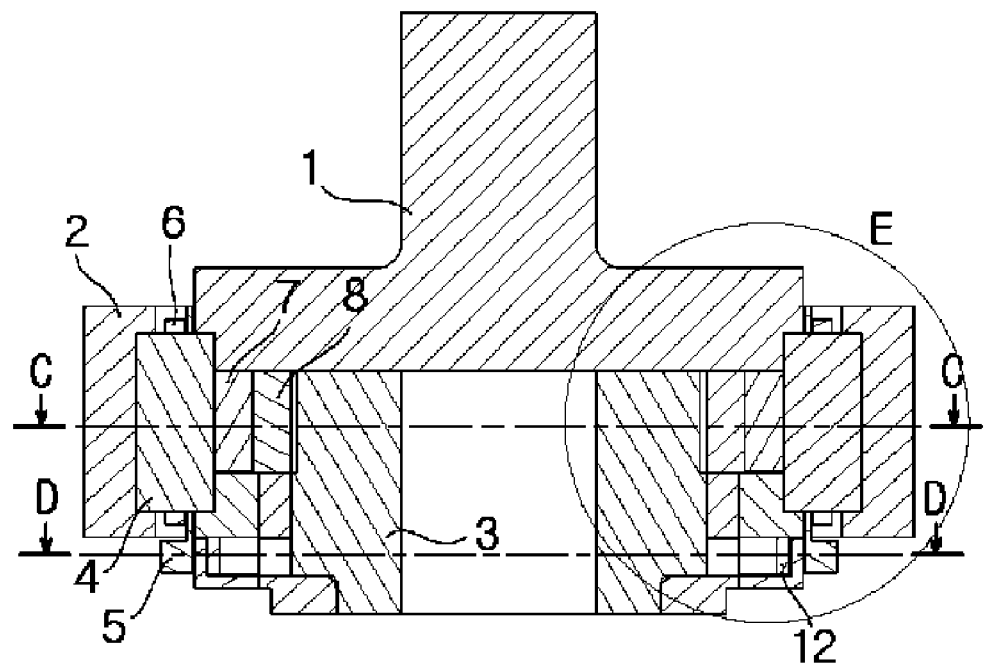
[Fig. 3]
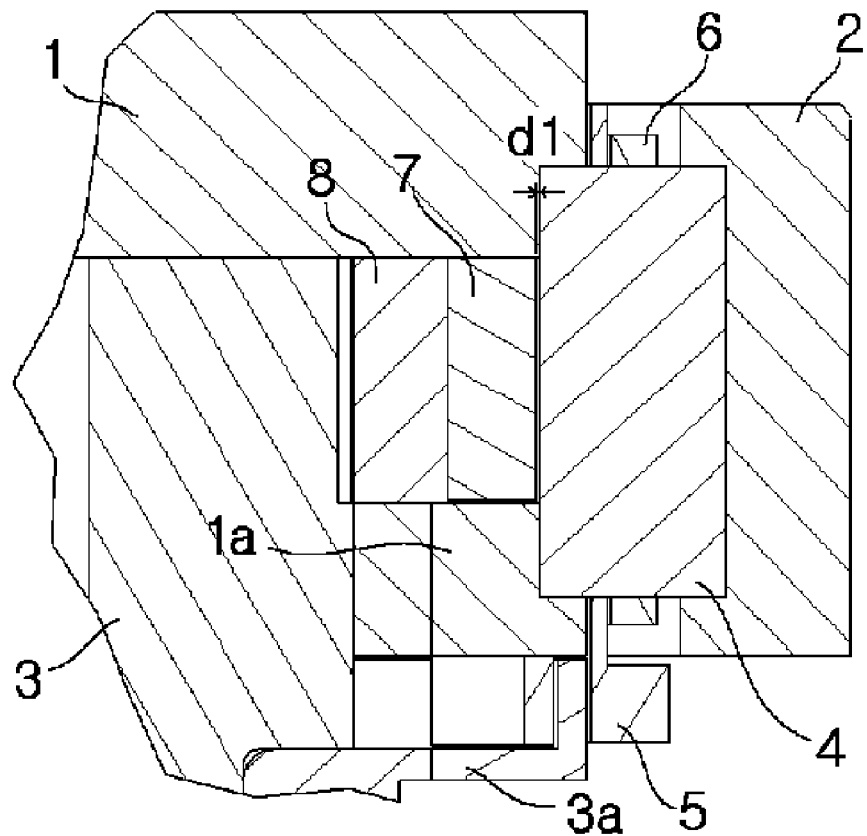
[Fig. 4]

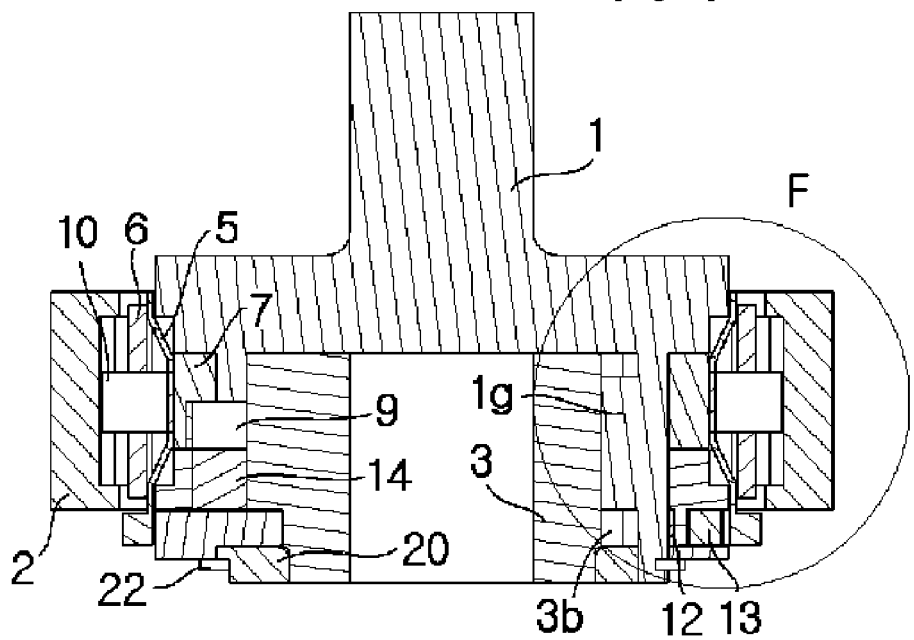
[Fig. 5]
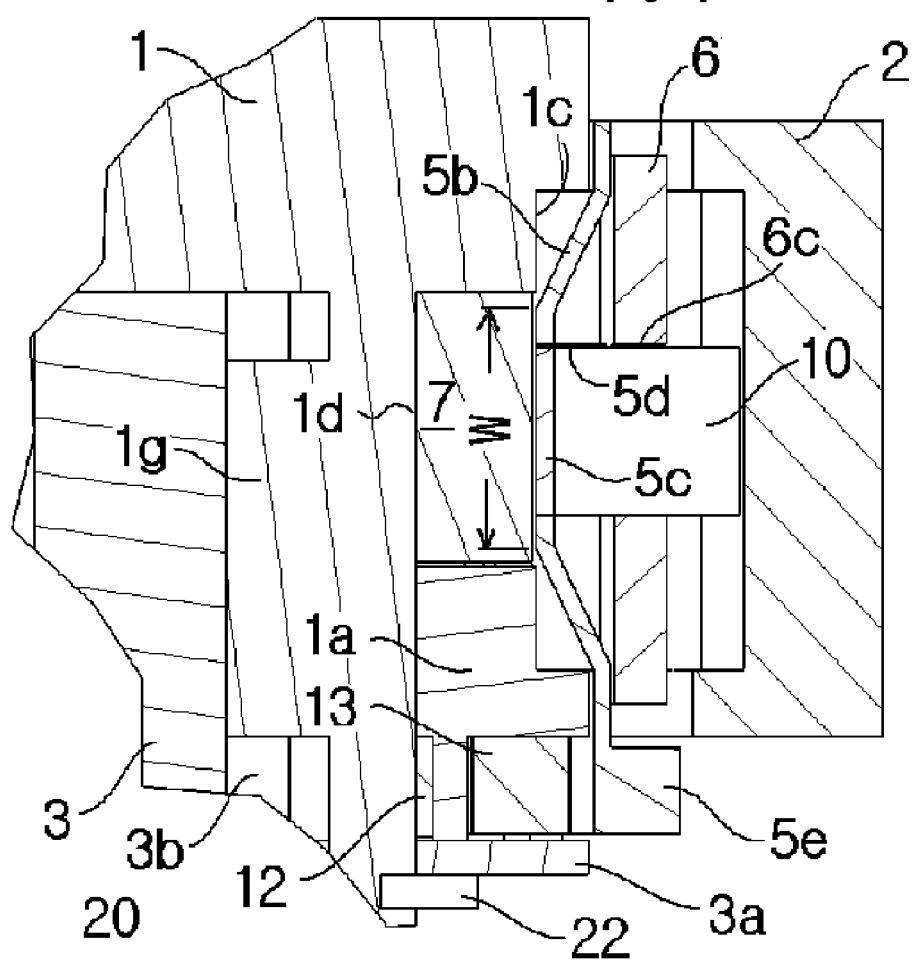
[Fig. 6]

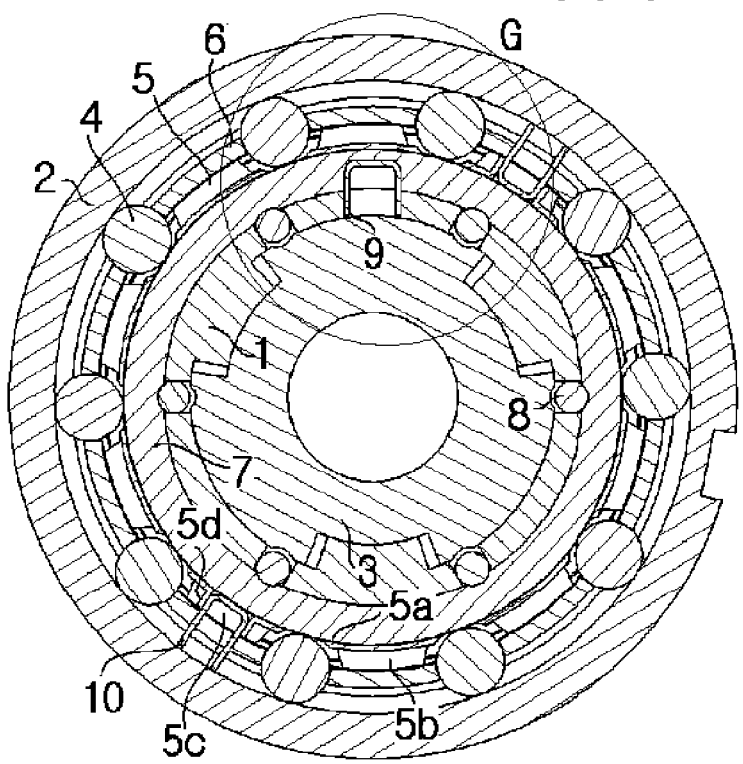
[Fig. 7]
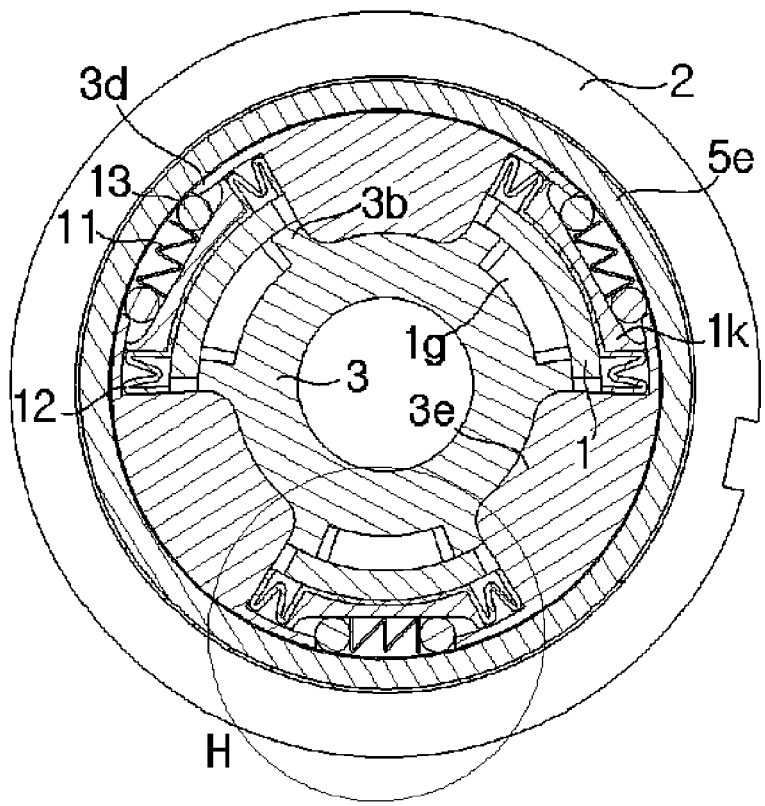
[Fig. 8]

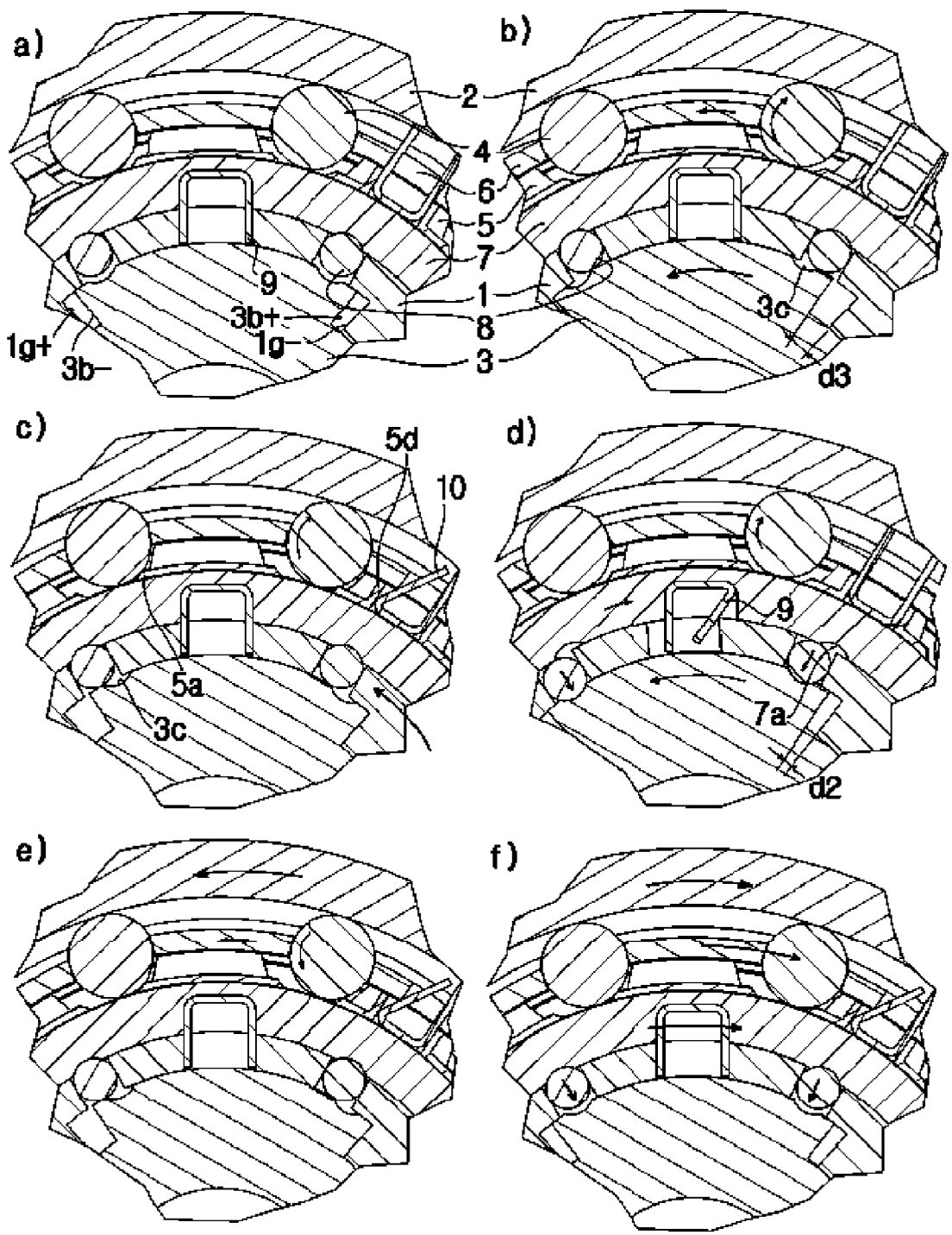
[Fig. 9]

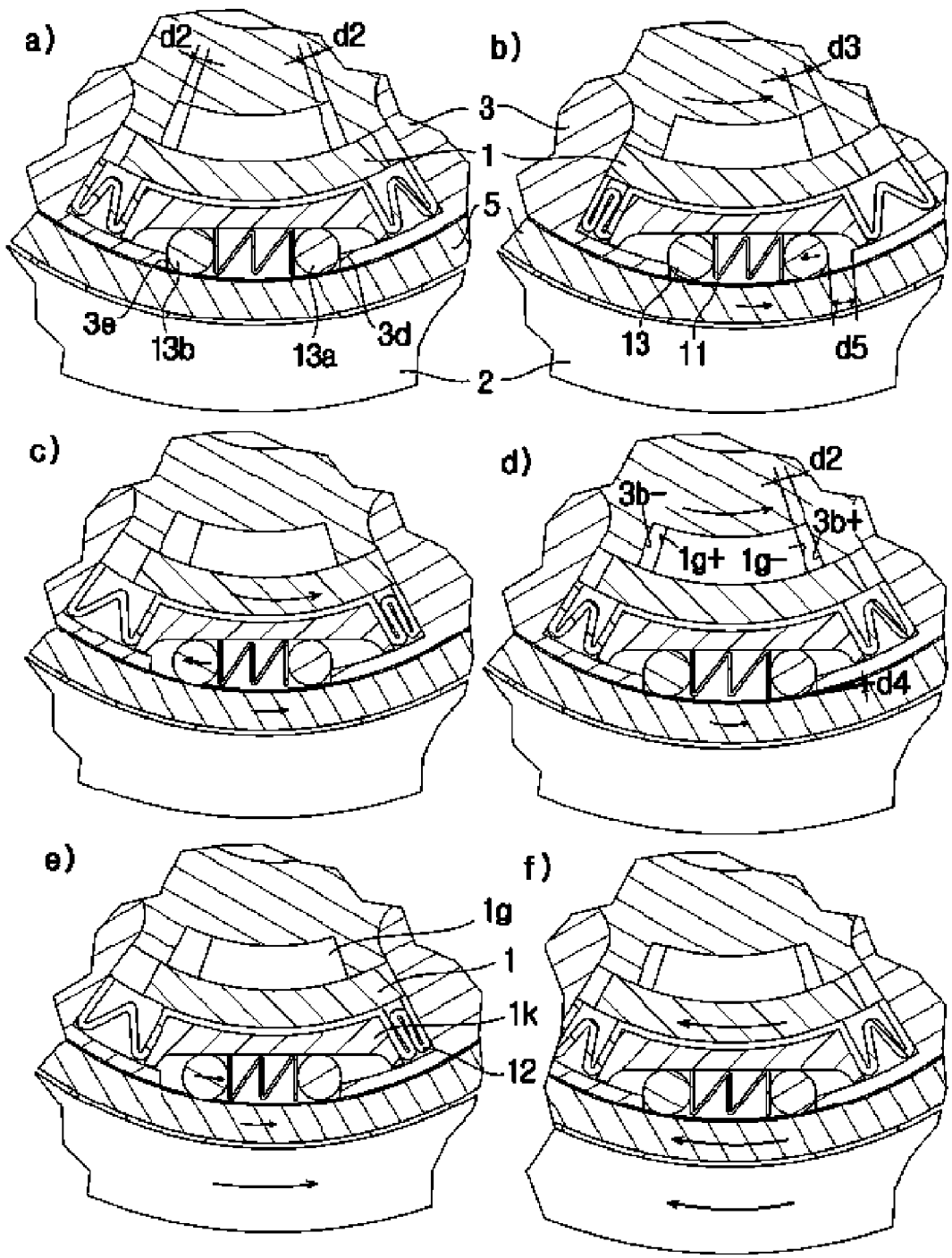
[Fig. 10]

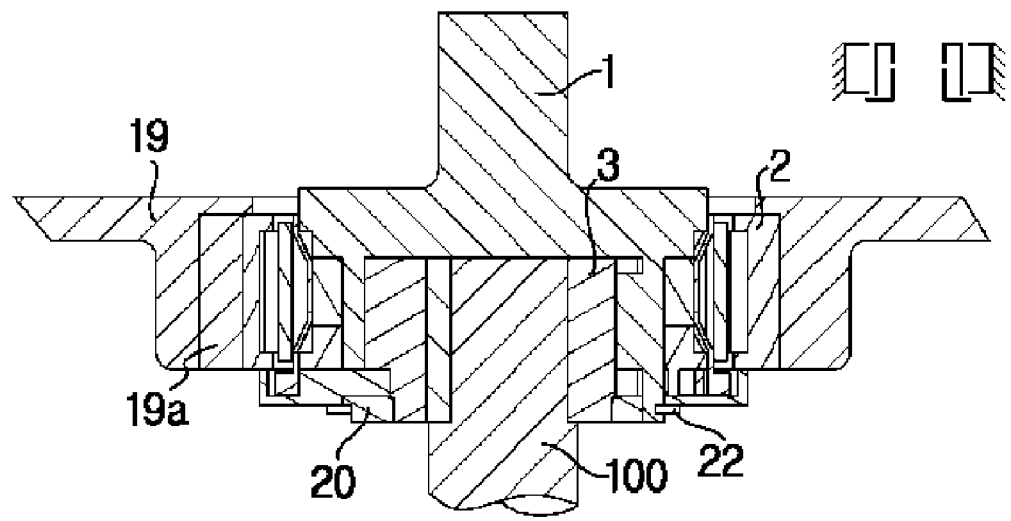
[Fig. 11]
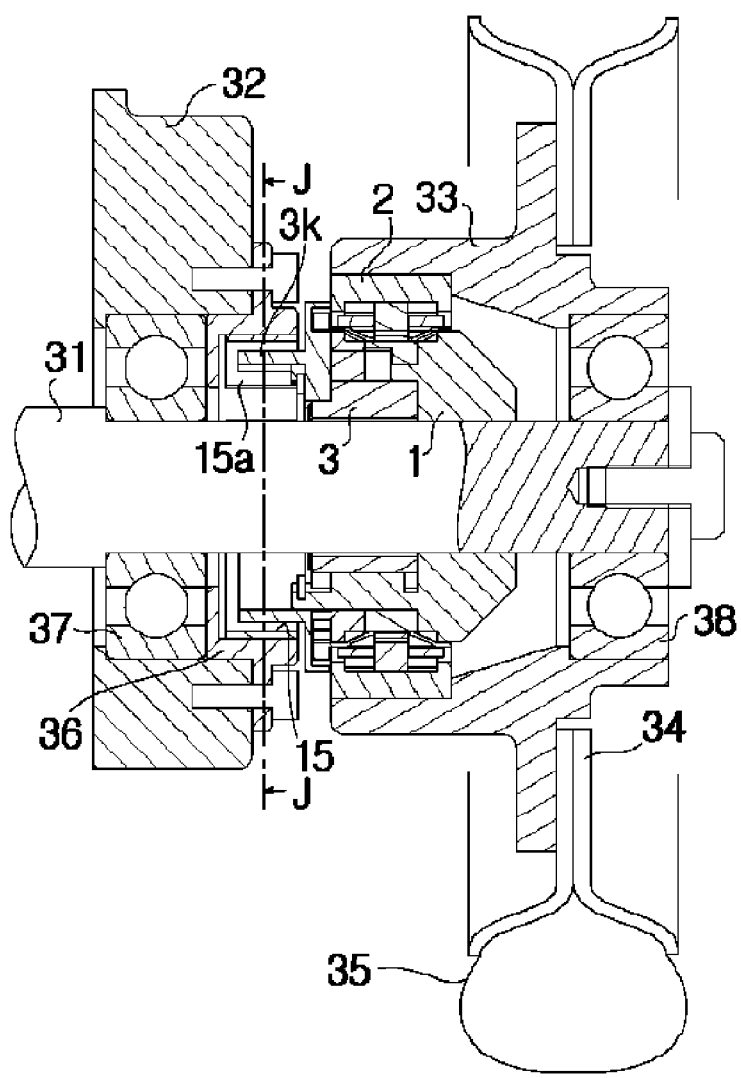
[Fig. 12]

[Fig. 13]
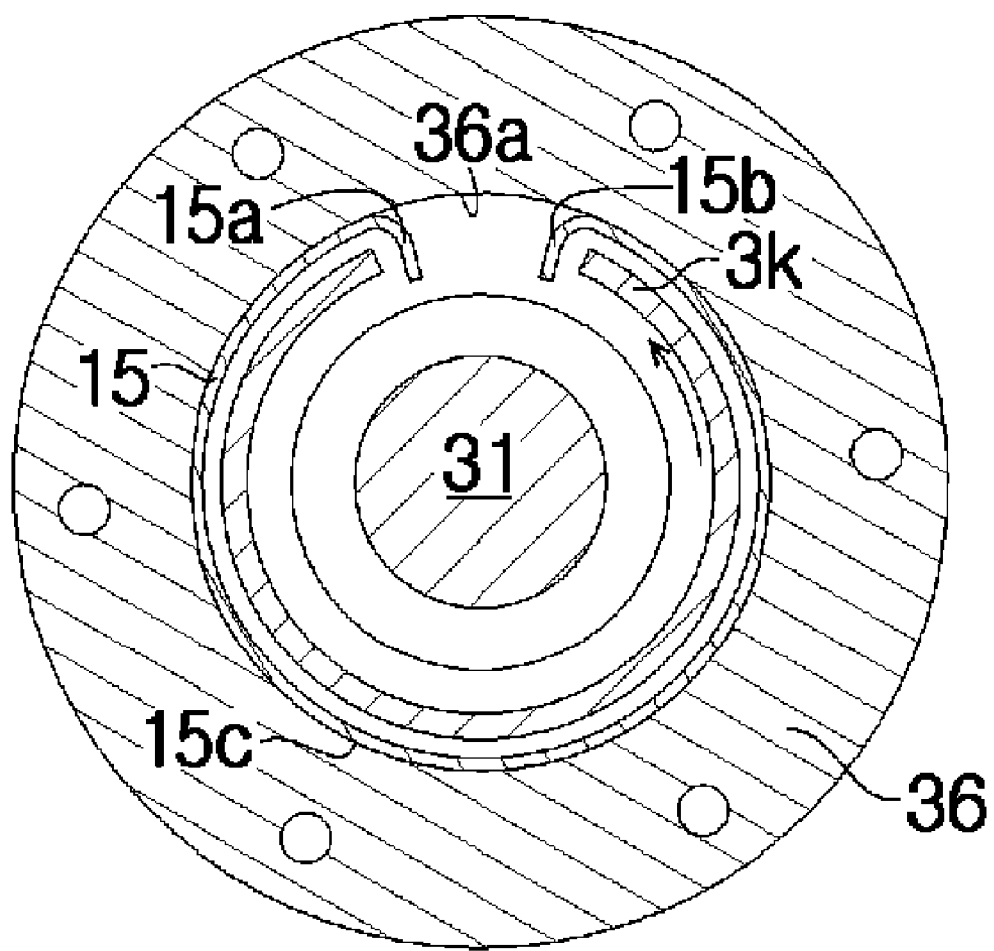
[Fig. 14]
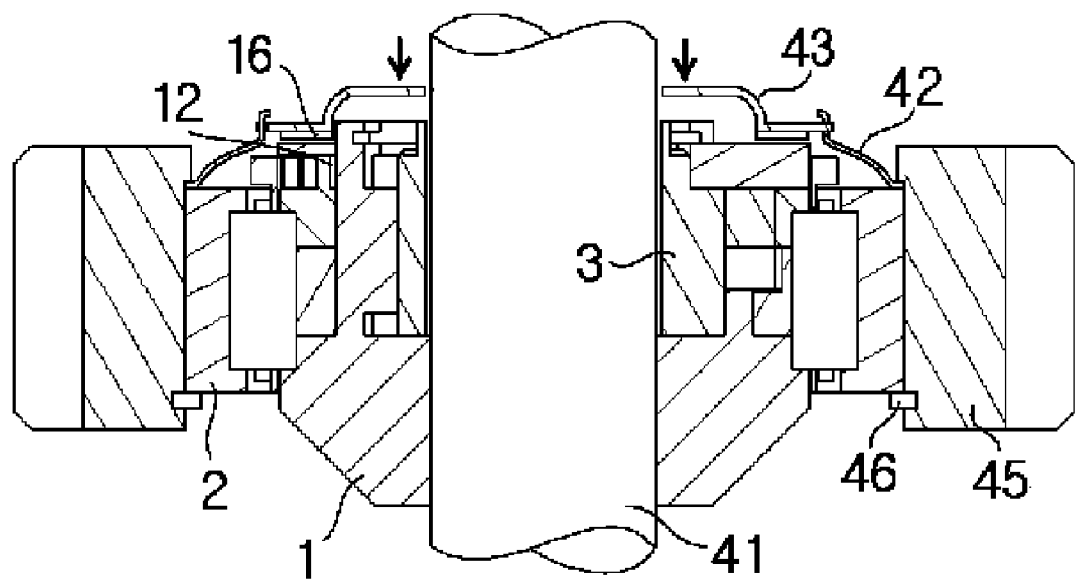

[Fig. 15]
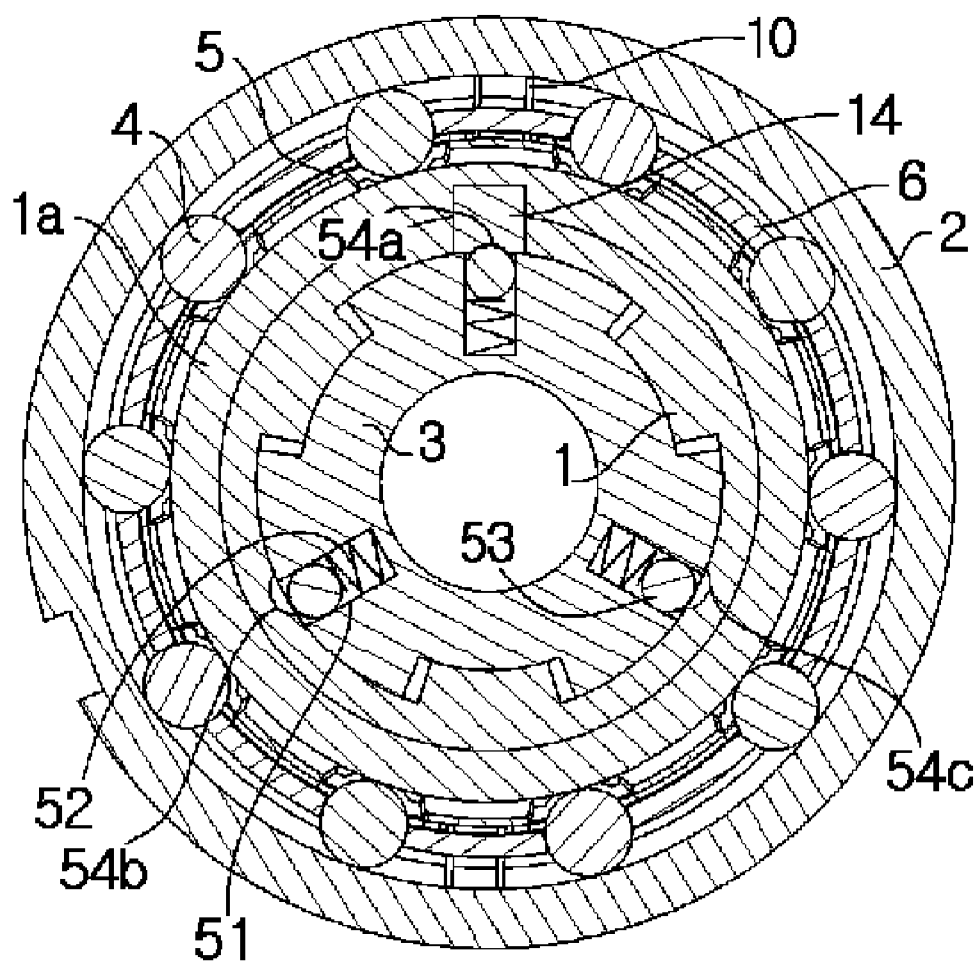
[Fig. 16]
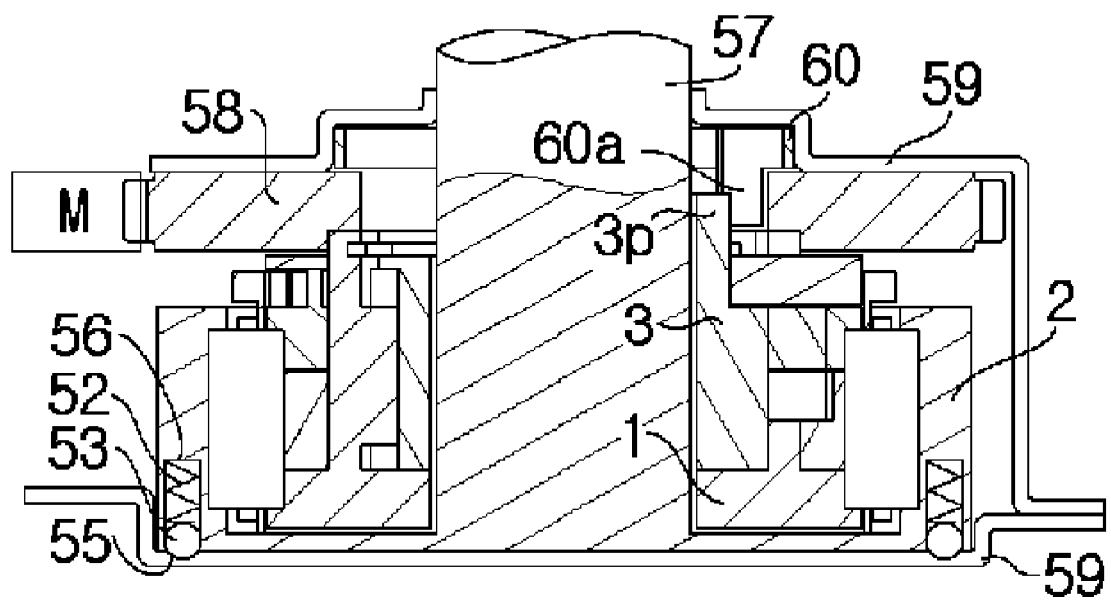

[Fig. 17]
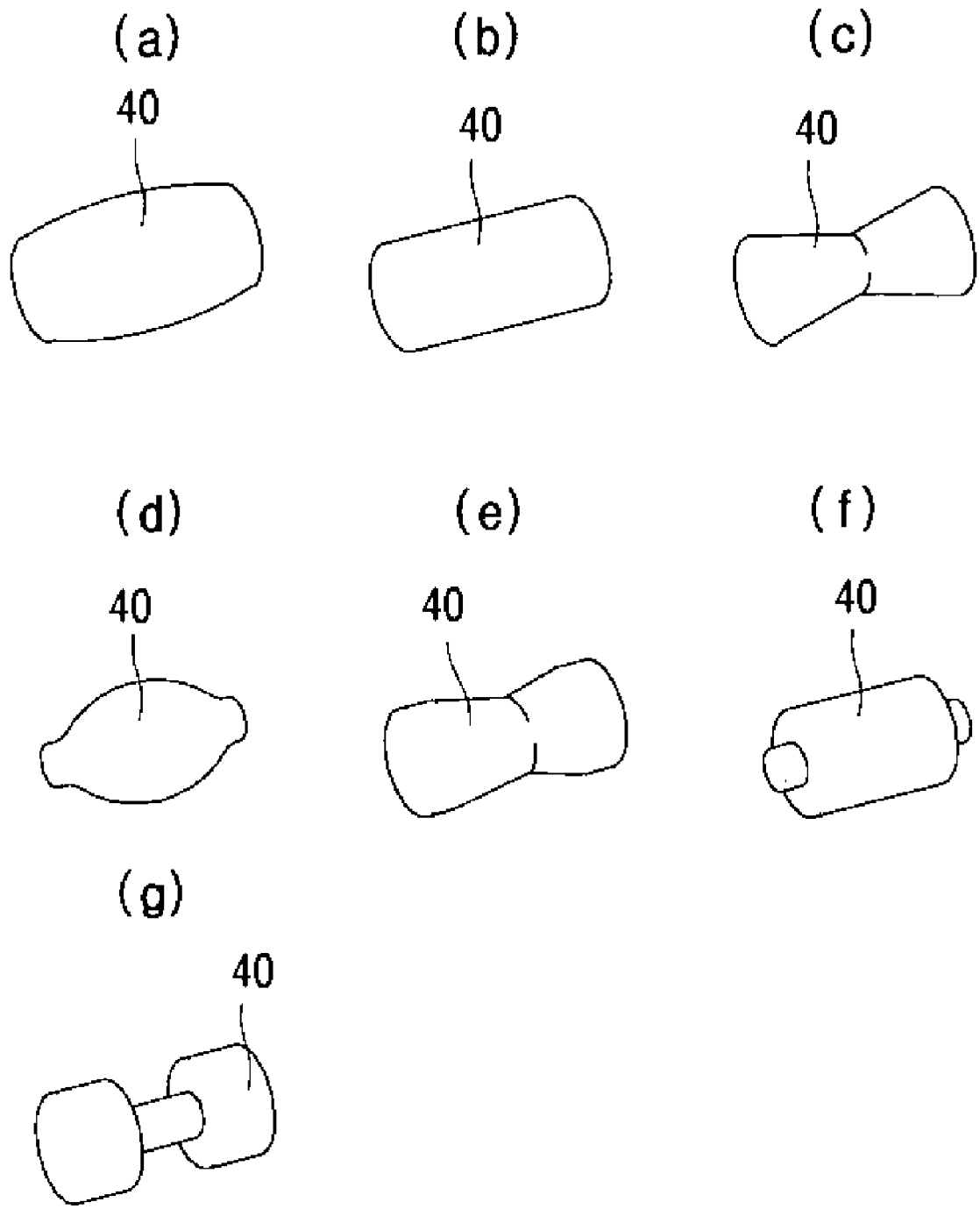

REVERSE INPUT PREVENT CLUTCH BEARING ASSEMBLY

TECHNICAL FIELD

This invention is about the reverse input prevention clutch, which performs a desired operation transmitting a forward and a reverse torque input from the input side to the output side but blocks a forward or a reverse torque input from the output side by engaging the output side to the housing or separating the restriction with the driving shaft by itself without any control given from the outside.

BACKGROUND ART

A traditional clutch generally transmits the rotational torque by combining two (or more) broad frictional surfaces and cuts the transmission of the torque by separating frictional surfaces, or permits the rotation by separating them and cuts the rotation by combining them. This type clutch needs broad frictional surfaces to transmit the torque and also needs a control device, and a hydraulic device to control the operation. There exists a possibility for damages and a segregation of components installed in the input side from the desired position by the back driving occurred in the wake of an unexpected reverse torque input from the output side.

A mechanical device, called a one-way clutch, which has two type (a roller, a sprag), exists to solve these reverse input problems by self-controlling either idling or the transmission of the rotational torque according to the rotational direction of the input shaft. It does not need a control device, like a hydraulic device, and makes each component driving in one way, which prevents the reverse directional rotation of each component. But when the unexpected torque from the output side according to the construction of the one-way clutch happens to occur, there still exists a high probability of damaging or segregating the location of equipment installed in the prefixed location in the input side.

A device to solve such a problem as back driving is proposed by lowering the general gearing efficiency. The goal is achieved by the negative outcome like using more driving power but reducing the overall system efficiency. For example, the worm and the worm gear are protected from the back driving when the torque is input from the output side of the gear device. Because this device is based on the overrunning clutch drive structure which has a taper shape attached to the shaft, when the movement of the shaft has both the specific axial and angular direction, the gearing to the axial direction to prevent the back drive is achieved. This structure consists of many small components which can bring more expense. We need a new clutch assembly with a little change to the shaft; a new clutch which has fewer components than the present assembly and has a chooseable function to fix the system driving train (the prevention of the back drive) and optimizes the efficiency of the worm and the worm gear system to decrease the problem of the back driving at a higher level.

A sprag type reverse locking clutch has been to prevent the back driving without decreasing the overall system efficiency. The torque input from the input shaft is transmitted to the output shaft by making the sprag not contact to the housing but the torque input from the output shaft is not transmitted to the input shaft by making the sprag contact to the housing, which locks the output shaft. It does not need any control device to operate and is divided into the bearing part, in which a ball is installed, and the clutch part, in which a sprag is installed. The U.S. Pat. Nos. 6,695,118 and 6,871,735 also has a clutch assembly using the roller to lock the output shaft or using the roller to cut the transmission of the torque to prevent the back driving, respectively. They set up pockets between the input shaft and the output shaft. It works in a manner that rollers are inserted and engaged in the pockets. When the axis of the input shaft relatively mismatches to the axis of the output shaft due to the separation of the clutch, it cannot support the load.

Until now, applying the proposed reverse input prevention clutches to the present system needs another installation of the bearing to support the load, which means the composition of the two or three tier roller is needed. That is, the product needs more parts to support the load which cause the increasement of the cost of production, with the number of processes to assemble increased. Therefore not only the productivity is degraded, but also the size becomes large.

DISCLOSURE OF INVENTION

Technical Problem

In order to resolve the problems outlined above, an object of the present invention is to provide a reverse input prevention clutch bearing assembly (below called the assembly) which is capable of transmitting the forward and the reverse torque input from the input side to the output side fluently, while locking the forward and the reverse torque input from the output side (preventing from the back drive) by engaging a rotational orbit member of the output side with a fixed fixture or a rotational resistance applying means by itself without any control given from the outside.

An objective of the present invention is to provide the assembly with the capability of transmitting the forward and the reverse torque input from the input side to the output side fluently, while locking the forward and the reverse torque input from the output shaft by separating the output shaft with the input shaft so that the rotational orbit member of the output side is rotated idly by the forward and the reverse torque input from the output side.

An objective of the present invention is to provide the assembly which is capable of transmitting reversibly the forward and the reverse torque input from both the input side and the output side to the opposite side and is also easily capable of separating the reversible transmission of the torque.

An objective of the present invention is to provide the assembly functioning as a one-way clutch, which is capable of choosing the direction of the wedging.

An objective of the present invention is to provide the assembly which is installed in one unit which is capable of choosing one of the above mentioned function such as a locking assembly, a shutoff assembly, a two-way clutch assembly which transmits and separates the both directional rotation, a one-way assembly which can choose the wedging direction and is to function as one of those assembly and at the same time is to function as a bearing when it is not functioning as a clutch.

An objective of the present invention is to provide the assembly which has not only a lightweight and a compact structure but also realizes a new basic machinery element with a higher reliability.

Technical Solution

In order to achieve this objective, the assembly comprises a first rotational member and a second rotational member which are arranged on a coaxial line and have orbit surfaces with different radii; a plurality of rolling members which are arranged in a circumferential shape between the two orbit surfaces so that the outer circumferential surfaces of the same are contact-rotatable; a cage which supports the rolling members so that the arrangement of the rolling members is maintained; a control member which has a rotational direction gap with respect to the first rotational member and is engaged with the first rotational member so that the torque of the forward and the reverse direction is transmitted with a delay by the gap; and a wedge ring assembly which allows or does not allow the rolling members to rotate based on the change of the rotational direction gap between the first rotational member and the control member and the rotational direction of the control member so that the torque is transmitted or not between the first rotational member and the second rotational member.

The assembly is installed in one unit working 1) the locking assembly in which the control member is restricted to the input side; the first rotational member is restricted to the output side; the second rotational member is restricted to a non-movable fixture or a rotational resistance applying means so that the locking assembly functions as a bearing when the torque input from the input side can be transmitted to the output side, but the locking assembly functions as a clutch when the torque input from the output side can not be transmitted to the input side by locking the output side; and working 2) the shutoff assembly in which the first rotational member is restricted to the input side; the second rotational member is restricted to the output side; the control member is restricted to the rotational resistance applying means like a fixed housing and the control member rotates led by the first rotational member receiving the rotational resistance torque provided by the rotational resistance applying means so that the shutoff assembly functions as a clutch when the torque can be transmitted, but the shutoff assembly functions as a bearing because the first rotational member is separated from the second rotational member when the second rotational member rotates faster than the first rotational member due to the back driving. As the control member can be restricted to the inner ring or the outer ring, so the assembly can be divided into the inner-ring control type assembly and the outer-ring control type assembly.

The wedge ring assembly preferably includes a rotational orbit member which is rotatably supported by the first rotational member between the first rotational member and the rolling member and which provides a part of the orbit surface; the rotational orbit restriction member which allows the rotational orbit member to rotate idly when the rotational direction gap is in an intermediate position in both directions but which is restricted to the first rotational member when the rotational direction gap is oriented in a certain direction; a wedge ring which is elastically restricted to the cage in the rotational direction on a concentric circle and rotates together with the cage and houses a part of the rolling members, with a rotational direction wedge being formed along a circumferential surface of the rotational orbit member for substantially restricting the rotation of the rolling member and the rotational orbit member, and the wedge ring is arranged closely with the rotational orbit member, with the wedge ring being designed to cooperate with the rotational orbit member; and a wedge ring restriction member which provides the rotational resistance torque to the wedge ring so that the wedge ring either rotates with the cage or relatively rotates with respect to the cage.

The rotational orbit member preferably includes a plurality of rotational orbit restriction cam engaging grooves which are formed along a circumferential surface of the rotational orbit member so that the rotational orbit member is restricted to the first rotational member and the first rotational member is preferably consisted of two rings and two rings are engaged in axial direction to make one unit for hanging the rotational orbit member.

The rotational orbit member can be housed in the rolling members or the first rotational member. A cross section of the rotational orbit member can be such a various shape as a tetragon with one side inclined, a tetragon with a curved surface, a right triangle besides the tetragon. So the plane of the first rotational member or the plane of the rolling members to house the rotational orbit member can be formed according to the shape of the rotational orbit member. Each shape of the rotational orbit member is formed for fluent operation too tight to be fitted into the first rotational member or the rolling members when the rotational orbit member moves in axial direction.

To resolve the difficulties of the manufacture and the assembly the first rotational member has a groove to house the rotational orbit member. It is effective that two rings are integrated in axial direction to make a groove for hanging the rotational orbit member by engaging two circular members having protrusions extended from the side of the circular member. It is easy to make some penetration holes, especially the square penetration holes, for housing the rotational orbit restriction cam on the joint surface.

A rotational orbit restriction member includes: a plurality of the rotational orbit restriction cam mounting holes which are formed along a circumferential surface; a plurality of the rotational orbit restriction cam engaging grooves which are formed along a circumference of the rotational orbit member contacting with the first rotational member; a rotational orbit restriction cam guide surface (including a groove) of the control member which is formed correspondingly to the rotational orbit restriction cam mounting hole and which provides a certain space in which the rotational orbit restriction cam freely moves and when the rotational direction gap is in an intermediate position, the rotational orbit restriction cam guide surface allows the rotational orbit restriction cam to protrude to the control member but when the rotational direction gap is oriented in a certain direction, the rotational orbit restriction cam guide surface does not allow the rotational orbit restriction cam to protrude to the control member; and a rotational orbit restriction cam which moves freely between the rotational orbit restriction cam engaging groove and the rotational orbit restriction cam guide surface from the rotational orbit restriction cam mounting hole, with the rotational orbit restriction cam being protruded to at least either the rotational orbit restriction cam engaging groove or the rotational orbit restriction cam guide surface.

The rotational orbit restriction cam guide surface pushes the rotational orbit restriction cam into the rotational orbit restriction cam engaging groove to make the rotational orbit member be restricted with the first rotation member when the rotational direction gap is oriented in a certain direction but when the rotational direction gap is moving to the intermediate position, the rotational orbit member rotates idly as the rotational orbit restriction cam guide surface does not push the rotational orbit restriction cam into the rotational orbit restriction engaging groove.

The rotational orbit intermediate recovering spring is preferably included which makes a relative rotation between the rotational orbit member and the first rotational member when the torque larger than a prefixed elastic engaging torque of is applied to the rotational intermediate recovering spring, with the rotational orbit intermediate recovering spring deformed. When the torque to the rotational orbit intermediate recovering spring is removed, the rotational orbit intermediate recovering spring restores its original shape and position: the rotational orbit member returns to the intermediate position.

A pocket is formed on the circumferential surface of the rotational orbit member and another pocket is also correspondingly formed on the circumferential surface of the first rotational member. The rotational orbit intermediate recovering located between two pockets is arranged in a circumferential shape by which the rotational orbit member and the first rotational member are elastically engaged and are rotated together. When the torque larger than a certain recovering torque of the rotational orbit intermediate recovering is applied to the rotational orbit intermediate recovering, the rotational orbit member and the first rotational member are relatively rotated but when the torque is removed, the rotational orbit member returns to the intermediate position based on the elastic recovering torque of the rotational orbit intermediate recovering.

When the torque larger than the prefixed torque of the rotational orbit intermediate recovering spring is applied to a wedge ring intermediate recovering spring, the rotational orbit intermediate recovering spring is deformed to the degree that the restriction between the rotational orbit member, the wedge ring and the rolling member is released. When the torque pressured to the rotational orbit intermediate recovering spring is decreased below the prefixed torque of the rotational orbit intermediate recovering spring after the release, the rotational orbit member returns to the intermediate position preparing for the insertion and the restriction with the first rotational member by the rotational orbit restriction cam. A coil spring or a character U type plate spring can be reasonably used as the rotational orbit intermediate recovering spring.

A wedge ring is formed in a circular shape and includes: a plurality of horizontal member which have pockets for housing the rolling members in a relative rotatable manner with respect to the cage along a circumference of the wedge ring; a pocket which is provided on the horizontal member for an elastic engagement with the cage; a rotational direction wedge which is extended from the horizontal member in both directions toward the gap between the orbit surfaces of the rotational orbit member and the rolling member; a circular hanging ring which provides an operation surface of the wedge ring restriction cam and connects the horizontal members. The hanging ring supports the wedge ring to minimize the deformation of the wedge ring when the wedge ring is pressured by the wedge ring restriction cam. The wedge ring is made of thin plate elastic member.

In the abovementioned structure, the wedge ring preferably includes; the rotational direction wedge in both directions which provides a wedging function to restrict the rotation of the rolling members housed in the cage and is an elastic member which is elastically deformed down by the pressure of the rolling members to contact the rotational orbit member; a pocket is formed on the horizontal member of the wedge ring toward the cage direction to house the wedge ring intermediate recovering spring which makes the wedge ring engage elastically with the cage and the wedge ring and the cage rotates together when the wedge ring intermediate recovering spring is in the intermediate position; a hanging ring which is located in the groove of the first rotational member or on the one shoulder of the first rotational member has an operating surface of the wedge ring restriction cam to make the wedge ring be restricted with the first rotational member.

The wedge ring provides the rotational direction wedge between the rolling member and the rotational orbit member. The end of the rotational direction wedge is skewed to a certain degree to make the plane of the insertion and restriction in the circumferential direction of the wedge ring over the centric axis and is elastically deformed. The width (w) of the rotational direction wedge can not surpass the width of the rotational orbit member.

The wedge ring preferably includes the wedge ring intermediate recovering spring by which the cage and the wedge ring are elastically engaged in the rotational direction and are rotated together. When the torque larger than a certain elastic recovering torque of the wedge ring intermediate recovering spring is applied to the wedge ring, the wedge ring is relatively rotated with respect to the cage but the wedge ring returns to the intermediate position based on the elastic recovering torque of the same when said torque is removed.

A pocket is formed on the circumferential surface of the wedge ring and another pocket is also correspondingly formed on the circumferential surface of the cage. The wedge ring intermediate recovering located between two pockets is arranged in a circumferential shape by which the wedge ring and the cage are elastically engaged and are rotated together and is a thin spring. When the wedge ring intermediate recovering spring is in the intermediate position, the wedge ring allows the rolling member to rotate and is not inserted and restricted to the rolling member and the first rotational member. When the torque larger than the prefixed torque of the wedge ring intermediate recovering spring is pressured to the wedge ring intermediate recovering spring by the wedge ring restriction cam, the wedge ring intermediate recovering spring deforms to the degree that the wedge ring is inserted and restricted to the rolling member. When the torque begins to decrease below the prefixed torque of the wedge ring intermediate recovering spring, the wedge ring intermediate recovering spring pressures the wedge ring and returns to the original intermediate position in order for the wedge ring to rotate together with the cage.

The wedge ring restriction member is a preferably two-way clutch which makes the wedge ring restriction member guide in order for the wedge ring not to engage with the first rotational member when the direction of a torque transfer surface of the control member contacting with the first rotational member is the same as the rotational direction of the control member. When the direction of the torque transfer surface of the control member which is contacting the first rotational member differs from the rotational direction of the control member, the two-way clutch makes the wedge ring restriction member guide in order for the wedge ring to engage with the first rotational member.

It is desirable to use a variety of the already opened two-way clutch which makes the wedge ring not engage with the first rotational member, with the torque of the control member transmitted to the first rotational member. The two-way clutch makes the wedge ring engage with the first rotational member, with the torque of the first rotational member transmitted to the control member.

For one example, a two-way clutch comprises; a wedge ring restriction cam guide surface which has a concave-skewed plane on the first rotational member to the circumferential direction; the wedge ring restriction cam which provides a wedging function between the wedge ring restriction cam guide surface and the wedge ring; the wedge ring restriction cam spring between the two wedge ring restriction cam which provides the elastic torque to pressure the wedge ring restriction cam in both directions so that the wedge ring restriction cam contacts the wedge ring; and a wedge ring restriction cam control protrusion which is protruded from the control member and which guides the position of the wedge ring restriction cam.

The wedge ring restriction cam control protrusion preferably pressures the wedge ring restriction cam to make the wedge ring restriction cam not contact the wedge ring when the rotation direction gap is in the intermediate position in both directions. This means that when the control member is in the intermediate position, as the wedge ring restriction cam can not restrict the rotation of the wedge ring in both directions, the first rotational member and the second rotational member functions as a bearing.

For another example, the two-way clutch comprises; the wedge ring restriction cam guide surface which has a concave-skewed groove in the circumferential direction; the wedge ring restriction cam which provides the wedging function between the wedge ring restriction cam guide surface and the wedge ring; the wedge ring restriction cam control protrusion which is protruded from the control member and which guides the position of the wedge ring restriction cam; the wedge ring restriction cam spring which provides the elastic torque to pressure the wedge ring restriction cam in both directions so that the wedge ring restriction cam is movable because the wedge ring restriction cam spring is pressured by the wedge ring restriction cam control protrusion.

The rotational orbit restriction cam and the wedge ring restriction cam can be used a variety of sprag cams besides the cylindrical roller.

The cage which is consisted of two circular members having protrusions extended from the side of the circular member is effectively integrated by engaging in axial direction two circular members. The cage is a circular ring type rotational member.

The cage located between the orbit surfaces of the first rotational member and the second rotational member has some through pockets in circumferential shape which house the rolling member and which are shaped according to the appearance of the rolling member. The cage restricts as tight as possible the rolling member in the pocket. The rotational centric axis of the rolling members is always relatively constant in the pocket with respect to the cage when the rolling members are rotating. The cage has another pocket on the surface of the cage to house the wedge ring intermediate recovering spring so that the wedge ring intermediate recovering spring makes the cage elastically engage with the wedge ring. The integration of two circular member reduces the cost and is easy to manufacture.

When the first rotational member engages with the input side, the control member is preferably engaged with a rotational resistance applying means providing the rotational resistance torque like a physical resistance torque caused by the surface of the fixture which is fixed on the non-movable fixture and rotates led by the rotation of the input side. It is preferable for the above rotational resistance applying means to be a structure of a circular ring clamp which encircles the circumference of the control member. The rotation of the already tightened both terminal of a circular ring clamp is blocked by the fixture installed on the non-movable fixture so that the control member receives the frictional resistance torque.

The control member receiving the rotational resistance torque plays a role to switch the transmission of the torque in the shutoff assembly and the shutoff assembly needs a relatively small torque. The rotational resistance torque which is relatively small than the torque transmitted from the input side to the output side does not affect the both rotation of the input side and the output side. For example, as the frictional resistance torque (such as a sliding frictional resistance torque) is operated in a relatively small torque range, the frictional resistance torque is independent of the rotational speed and is not affected by the temperature; so, the initial response characteristic is excellent.

The shutoff assembly functions as a bearing in which the second rotational member (the output side) supports the first rotational member (the input side) when the rotational resistance is not provided to the control member. While the rotational resistance torque caused by the fixture is provided to the control member, the torque of the first rotational member is transmitted to the second rotational member. The back drive caused by the second rotational member is not transmitted to the first rotational member by separating the first rotational member from the second rotational member. When the rotational resistance torque caused by the second rotational member is provided to the control member, the torque is transmitted reversibly between the first rotational member and the second rotational member. The shutoff assembly is applied to the dog-clutch transmission by using a linking member which makes the second rotational member either engage or disengages with the control member by the rotational resistance torque.

The second rotational member can preferably engage either with the fixture which is impossible to rotate or with the rotational resistance applying means which provides the rotational resistance to the second rotational member as the second rotational member is additionally fixed between the second rotational member and the fixture which is not rotate. Especially, a disk shaped protrusion is reasonably formed on the second rotational member and the above fixture consists of a caliper which encircles and pressures a part of the above disk shaped protrusion, with the brake-pad attached on the above caliper as the rotational resistance applying means.

The locking assembly pressures the rotational resistance torque to the second rotational member and plays a role like the brake disk or the brake clutch that decreases the quantity of the reverse torque as the rotational resistance torque grows. So, it needs a relatively large torque. The rotational resistance applying means which is fixed to a non-movable fixture consists of a pressuring device (such as a disk & a caliper, a multi-disk brake) which allows the rotational resistance torque when the rotational resistance applying means contacts with the rotational member but does not allow the rotational resistance torque when the rotational resistance applying means is separated from the rotational member.

If the second rotational member is bounded to the non-movable fixture or provides the sufficiently large rotational resistance, the torque of the control member is transmitted to the first rotational member but the back drive from the first rotational member can not be transmitted to the control member because the reverse torque of the first rotational member is locked to the non-movable fixture. If the second rotation member provides the smaller rotational resistance torque than the back drive, the torque of the control member is transmitted to the first rotational member but the back drive of the first rotational member is offset by the rotational resistance torque receiving from the rotational resistance applying means and the remaining is transmitted to the input side. When no rotational resistance torque is given to the first rotational member, the torque between the control member and the first rotational member is transmitted reversibly.

A circular elastic member, the sliding spring, is blocked by the housing or the fixture and receives the frictional resistance torque to continuously provide the rotational resistance torque to the control member. The sliding spring which encircles the control member in the circumferential direction rotates led by the rotation of the control member receiving the rotational friction resistance torque (see FIG. 13).

A slide member is engaged between the control member and the second rotational member based on a slidable manner with each other and an actuator operates so that the control member and the second rotational member are engaged or disengaged through the slide member.

The control member also has a multiple torque transfer surfaces which transmit the torque with a delay caused by the rotational direction gaps which are formed between the multiple torque transfer surfaces of the control member and the multiple torque transfer surfaces of the first rotational member. A spline and a splined groove is preferably used to form the above multiple torque transfer surfaces of each member.

The rotational direction gap makes the relative rotation between the first rotational member and the control member, which causes the wedge ring to work. The rotation direction gap needs enough space to make the wedge ring operate though the rotational direction gap needs to be as narrow as possible for the earliest response speed with regard to the back drive.

A control member intermediate recovering spring which provides an automatic centering elastic torque for the rotational direction gap which is a gap between the torque transfer surface of the first rotational member and the torque transfer surface of the control member when no torque is provided to the control member is included for making the control member engage with the first rotational member.

The control member intermediate recovering spring can be located between the first rotational member and the control member to make the rotational direction gap even in both directions: the rotational direction gap is in the intermediate position. It is a thin plate spring or a coil spring to pressure both the first rotational member and the control member which is located in the rotational direction gap or a pocket which is formed between the first rotational member and the control member. It is sometimes inserted in a mid-space penetrating the first rotational member and the control member and has a kind of torsion bar style in which both the terminal of the control member intermediate recovering spring is fixed to the first rotational member and the control member, respectively.

The control member intermediate recovering spring maintains the intermediate position of the rotational direction gap and when the torque larger than the prefixed torque of the control member intermediate recovering spring is pressured to the control member intermediate recovering spring, the control member intermediate recovering spring deforms to the degree that the control member intermediate recovering spring makes the rotational direction gap disappear so that the control member engages multi-surfacedly with the first rotational member for the torque to be transmitted. When the torque larger the prefixed torque of the control member intermediate recovering spring is removed, the control member returns to its original position due to the elastic recovering torque of the control member intermediate recovering spring.

The locking assembly permits the back drive when the torque input from the out side is below the prefixed torque of the control member intermediate recovering spring while when the torque larger than the prefixed torque of the control member intermediate recovering spring is input, the locking assembly locks the back drive.

The shutoff assembly is separated and functions as a bearing which does not transmit the torque input from the input side to the output side when the torque below the prefixed torque of the control member intermediate recovering spring (the torque of the control member intermediate recovering spring is larger than the torque provided by the rotational resistance applying means) is pressured to the control member intermediate recovering spring. But the shutoff assembly is engaged and functions as a clutch which transmits the torque input from the input side to the output side when the torque larger than the prefixed torque of the control member intermediate recovering spring (the torque of the control member intermediate recovering spring is smaller than the torque provided by the rotational resistance member) is pressured to the control member intermediate recovering spring. The control member intermediate recovering spring is not an essential item but if the control member intermediate recovering spring is not installed, the back drive is not permitted.

The restraining means which restricts for the rotation direction gap either to be oriented in a certain direction or to be in an intermediate position in both directions can be included in the assembly when the abovementioned control member is engaged with the first rotational member. If the torque larger than the prefixed torque of the restraining means is pressured to the restraining means, the restraining means makes the control member disengage the first rotational member.

The restraining means consists of a elastic member which is inserted into a closed hole on the one rotational member and a protrusion member which is supported by the spring and protruded outwardly to engage the two rotational member by the elastic torque of the elastic member. The other rotational member has one (or more) concave guide groove which corresponds to the closed hole of the one rotational member. The restraining means is rotated by a small torque before one rotational member restricts the other rotational member regardless of the elastic torque of the elastic member and makes the two rotational member engaged with each other below the prefixed torque of the elastic member at the position used as predetermined receiving position and concurrently operating position. When the excessive torque over the prefixed torque of the elastic member pressures the protrusion member, the protrusion member pressures the restraining means and retreats to the closed hole so that the restricted rotational member rotates idly.

If the restraining means is applied to the location between the first rotational member and the control member, the assembly becomes the two-way clutch which can choose the direction of the latch. If the restraining means latches one of three hole, when the rotational direction gap is oriented in a certain direction, the assembly functions as a clutch to the rotation of the certain direction but functions as a bearing to the opposite directional rotation of the certain direction. If the rotational direction gap is oriented in the other direction, the restraining means latches the other hole and the latching direction of the clutch is changed. If the restraining means latches the remaining third hole, the rotational direction gap is in the intermediate position and the assembly functions either as a bearing to permit the rotation in both directions or as a clutch to block the rotation in both directions (see FIG. 15).

The restraining means which makes the second rotational member restricted to the place used as predetermined receiving position and concurrently operating position so that the second rotational member operates between the fixture on which the assembly is installed and the second rotational member and which releases the restriction of the second rotational member when the torque exceeding a certain torque of the restraining means is applied.

If the restraining means is applied to the second rotational member of the assembly and the fixed side, the restraining means maintains the pre-determined engaging position below the prefixed torque for normal operation. A device like the rear mirror of the vehicle is unlatched at the pre-determined engaging position by shock from the outside larger than the prefixed torque of the restraining means and the damage is absorbed by idle rotation of the device as the device is separated from the input side. So the assembly having the restraining means can be used for the shock protection device.

The rolling member contacting the orbit surfaces of the first rotational member and the second rotational member can be one among the cylinder member, the sphere member, the spheric cylinder member, the inclined cylinder member, the needle shape member, the sand watch member, the two-step member and provides the small circular space to house the rotational orbit member cooperating with the circumferential surface. The rolling member like the spheric cylinder member, the sphere member and the needle shape member forms a concave groove on the circumferential surface to house the rotational orbit member. The concave part of the rolling member like the sand watch or the inclined two-step member provides the space to house the rotational orbit member cooperating with the first rotational member. The different shape of the rolling member can be mixed.

In the reverse input locking clutch bearing assembly each components play the below roles to prevent the back drive. The control member which receives the torque input from the input side and the first rotational member which outputs the torque input with a delay by the rotational direction gap are a splined engagement with each other. The second rotational member supports rotatably the first rotational member. The rotational resistance applying means provides the rotational resistance torque to the second rotational member. The plurality of rolling members are arranged in a circumferential shape so that the outer circumferential surfaces of the rolling members are contact-movable between the orbit surfaces of the first rotational member and the second rotational member. The locking means provides a wedging function to the rolling members for substantially restricting the rotation of the rolling members when the direction of a torque transfer surface of the first rotational member drivingly contacting with the control member is the same as the rotational direction of the first rotational member. The unlocking means releases the wedging function to the rolling members as the rotational direction gap is returning to an intermediate position in both directions from the restricted state of the rolling members. The reverse input locking clutch bearing assembly which is capable of transmitting the forward and the reverse torque input from the input side to the output side fluently because the locking means does not work, while locking the forward and the reverse torque input from the output side (preventing from the back drive) by engaging the rotational orbit member of the output side with the fixed fixture or the rotational resistance applying means because the locking means works.

In the reverse input shutoff clutch bearing assembly, each components play the below roles to prevent the back drive. The first rotational member is the input side from which the torque is input. The second rotation member which supports rotatably supports the first rotational member is the output side which outputs the torque. The control member contacts with the first rotational member to transmit the torque with a delay by the rotational direction gap. The rotational resistance applying means which is engaged with the fixture provides the rotational resistance torque to the control member so that the control member is led by the first rotational member. The plurality of rolling members which are arranged in a circumferential shape so that the outer circumferential surfaces of the rolling members are contact-movable between the orbit surfaces of the first rotational member and the second rotational member. The locking means which provides a wedging function to the rolling member for substantially restricting the rotation of the rolling member when the direction of a torque transfer surface of the first rotational member drivingly contacting with the control member is the same as the rotational direction of the first rotational member. The unlocking means which releases the wedging function to the rolling members as the rotational direction gap is returning to an intermediate position in both directions from the restricted state of the rolling members. The reverse input shutoff clutch bearing assembly is capable of transmitting the forward and the reverse torque input from the input side to the output side fluently because the locking means works, while locking the forward and the reverse torque input from the output shaft by separating the output shaft with the input shaft so that the rotational orbit member of the output side is rotated idly by the forward and the reverse torque input from the output side because unlocking means works.

The locking and unlocking means has preferably below components. The cage supports the rolling members and maintains an arrangement of the rolling members. The rotational orbit member which is rotatably supported by the first rotational member between the first rotational member and the rolling members provides a part of the orbit surface. The rotational orbit restriction member which allows the rotational orbit member to relatively rotate with respect to the first rotational member as the rotational direction gap is returning to the intermediate position in both directions, and which makes the rotational orbit member be substantially restricted by the first rotational member as the rotational direction gap is oriented in a certain direction. The wedge ring which is elastically engaged with the cage in the rotational direction of the cage houses the rolling member, with a rotational direction wedge being formed along a circumferential surface of the rotational orbit member for substantially restricting the rotation of the rolling member and the rotational orbit member, and with the wedge ring being designed to cooperate with the rotational orbit member. The wedge ring restriction member provides a rotational resistance torque to the wedge ring so that the wedge ring either rotates with the cage or relatively rotates with respect to the cage. The terminology used in the above locking and unlocking means has the same meaning and function as the terminology already explained. The detailed explanation of each component is omitted.

ADVANTAGEOUS EFFECTS

The present invention is a basic mechanical element which can be set in one unit and is divided into two types. When the back drive occurs, to prevent the back drive the locking type locks the output side while the shutoff type separates the output side from the input side. It can be classified the inner-ring control type and the outer-ring control type according to the location of the control member. It is also grouped the torque restriction type and the torque-free type according to the size of the torque when it functions as the clutch but it functions as a bearing when it does not function as the clutch.

If the rotational direction gap is fixed in the intermediate position, the present invention functions as the two-way clutch: it function as the clutch when the wedge ring restriction cam works but it functions as the bearing when the wedge ring restriction cam does not work. The present invention functions as a one-way clutch: it functions as the clutch in the rotation of the certain direction when the rotational direction gap is fixedly oriented in a certain direction, but it functions as the bearing in the opposite directional rotation of the certain direction.

The present invention can substitute for the existing bearing, the one-way clutch and the two-way clutch. It is also applied to the variety of field such as the protection of the driving device, the position maintenance of the output shaft, the braking and the idle rotation of the output shaft or the hybrid devices which use two power sources either alternatively or at the same time.

The present invention reduces half the number of the gearing because it uses the one tier gear to function as both the clutch and the bearing and reduces the cost. The efficiency to assemble is growing due to the reduction of the components. The size also is compact because the width of the bearing and the clutch components is reduced. The reverse input prevention function maximizes the efficiency of the system because the power source (e.g. the electric motor) can be reduced to the lower level to satisfy the original purpose.

We call the present invention a BUGULBA or a CLURING (clutch-bearing) because it has the bearing function and the clutch function at the same time.

The best mode below illustrates not only the structural and functional description but the desired method how to apply the best mode. It can be illustrated without changing the basic idea of this present invention. It includes every changable mode which is applicable in the scope of the described idea in the claims attached.

BEST MODE FOR CARRYING OUT THE INVENTION

FIG. 2 is a disassembled description view showing the disassembled arrangement of every component of the inner-ring control type assembly according to the desired best mode;

FIG. 3 is a cross sectional view of the FIG. 1 along the line A-A;

FIG. 4 is a enlarged piece view showing the essential part E of the FIG. 3;

FIG. 5 is a cross sectional view of the FIG. 1 along the line B-B;

FIG. 6 is a enlarged piece view showing the essential part F of the FIG. 5;

FIG. 7 is a cross sectional view of the FIG. 3 along the line C-C;

FIG. 8 is a cross sectional view of the FIG. 3 along the line D-D;

FIG. 9 is a step-by-step situation view showing the process of the insertion and restriction and the release between the rolling members, the wedge ring and the rotational orbit member to explain the enlarged piece drawing showing the essential part G of the FIG. 7;

Figure 1:
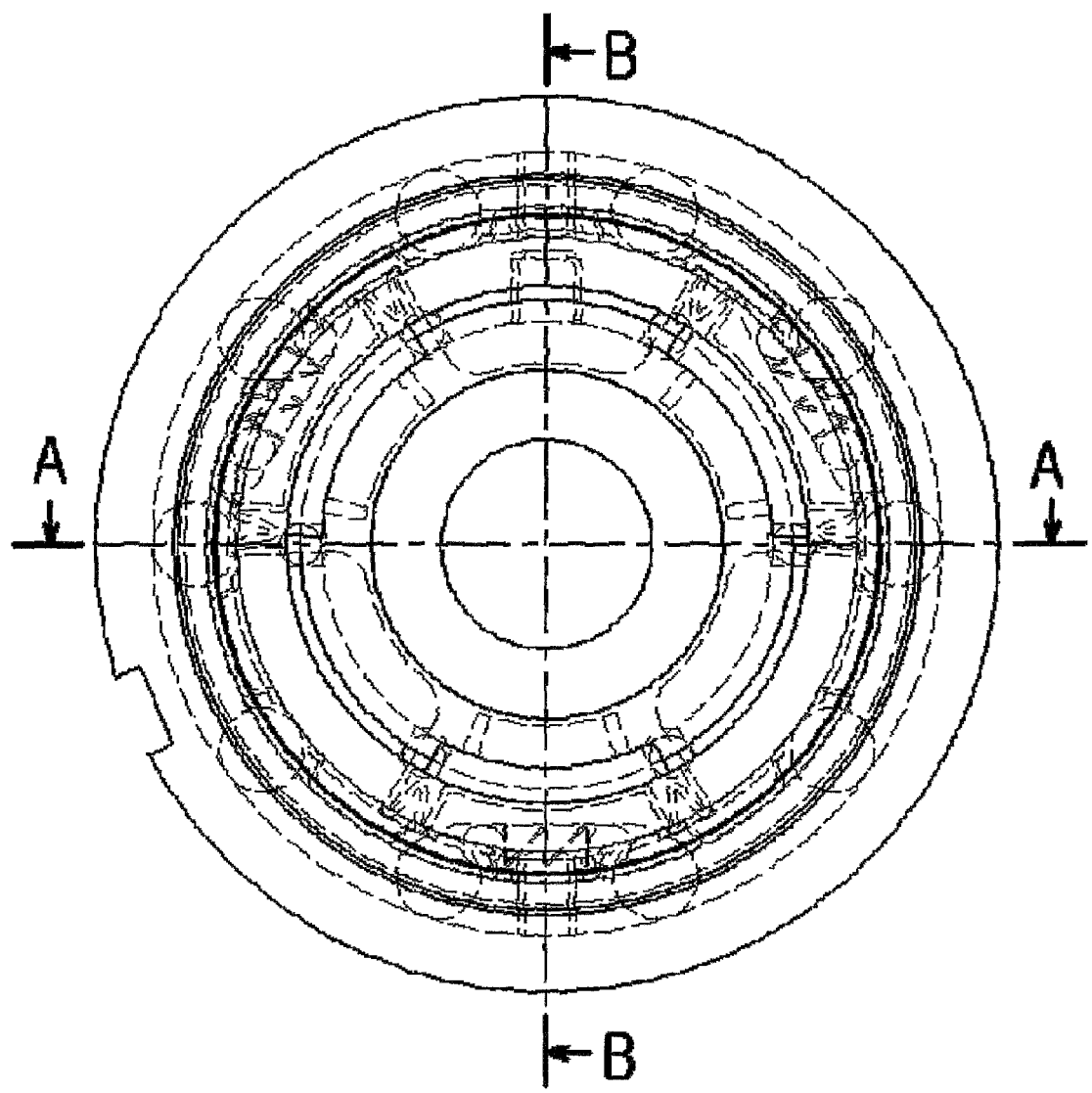
FIG. 1 is a front perspective view showing the manufactured appearance of the inner-ring control type assembly according to the desired best mode.

a) A piece Fig. showing that the control member is in the intermediate position without any torque input from the outside;

b) A piece Fig. showing that the control member is rotating in the counterclockwise direction;

c) A piece Fig. showing that the first rotational member is rotating in the counterclockwise direction;

d) A piece Fig. showing that the rolling members become rotatable under the condition FIG. 9c; because the counterclockwise rotation of the control member provides some space in which the rotational orbit restriction cam moves, the control member and the first rotational member becomes an intermediate position, making the rotational orbit member rotatable. The wedge ring in turn makes the rotatable rotational orbit member rotate, which makes the rotational direction wedge release the insertion and restriction with the rolling member, with the wedge ring return to the intermediate position;

e) A piece Fig. showing that the second rotational member is rotating in the counterclockwise direction;

f) A piece Fig. showing that the second rotational member is rotating in the clockwise direction;

FIG. 10 is a step-by-step situation view showing the process of insertion and restriction and release between the wedge ring and the first rotational orbit member according to the rotational direction gap and the rotational direction to explain The Enlarged Piece Drawing showing the essential part H of the FIG. 7;

a) A piece Fig. showing that the control member is in the intermediate position without any torque input from the outside;

b) A piece Fig. showing that the control member is rotating in the counterclockwise direction;

c) A piece Fig. showing that the first rotational member is rotating in the counterclockwise direction;

d) A piece Fig. showing that the rolling members become rotatable under the condition FIG. 9c; because the counterclockwise rotation of the control member provides some space in which the rotational orbit restriction cam moves, the control member and the first rotational member becomes an intermediate position, making the rotational orbit member rotatable. The wedge ring in turn makes the rotatable rotational orbit member rotate, which makes the rotational direction wedge release the insertion and restriction with the rolling member, with the wedge ring returning to the intermediate position;

e) A piece Fig. showing that the second rotational member is rotating in the counterclockwise direction;

f) A piece Fig. showing that the second rotational member is rotating in the clockwise direction;

FIG. 11 is a cross sectional view of the best mode showing the operation of the inner-ring control type assembly installed on the housing according to the best mode;

FIG. 12 is a cross sectional view of the best mode showing the operation of the inner-ring control type shutoff assembly installed on the hybrid cart which is moving either by the man-power or automatically by the battery-driven motor according to the best mode;

FIG. 13 is a cross sectional view of the FIG. 12 along the line J-J;

FIG. 14 is a cross sectional view of the best mode showing the operation of the inner-ring control type two-way assembly which allows either the transmission of the forward and the reverse rotation in both directions or not allow the transmission by the switch according to the best mode;

FIG. 15 is a cross sectional view of the best mode showing the operation of the inner-ring control type one-way assembly which can choose the latching direction by using the ball plunger as the restraining means between the first rotational member and the control member according to the best mode;

FIG. 16 is a cross sectional view of the best mode showing the operation of the inner-ring control type assembly which protects the damage of the motor-driven rear mirror by using the ball plunger as the restraining means between the second rotational member and the car body according to the best mode;

FIG. 17 is a shape description view showing different shapes of the rolling member applied to the assembly;

THE EXPLANATION OF SIGNS SHOWN IN THE FIGURES OF THE ESSENTIAL PARTS d1 is a gap in radial direction between the rolling members and the outer circumferential surface of the rotational orbit member;

d2 is a rotational direction gap between the first rotational member and the control member in the intermediate position;

d3 is a rotational direction gap between the first rotation member and the control member when the control member is oriented in a certain direction;

d4 is a gap in radial direction between the wedge ring and the wedge ring restriction cam in the intermediate position;

d5 is a gap in rotational direction between the wedge ring restriction cam and the wedge ring restriction cam control protrusion when the wedge ring restriction cam is oriented in a certain direction;

w is a width of the rotational direction wedge on the rotational orbit member when the wedging function is provided;

MODE FOR THE INVENTION

The best mode is explained for the inner-ring control type reverse input prevention clutch bearing assembly referring to the attached drawings.

The first rotational member (1) is located in the inner ring (1) of the assembly in the best mode. The outer circumferential surface of the inner ring (1) is dug to make a orbit surface (1c) which is contacting the roller (4), namely, the rolling member (4) and the concave groove is formed at the centric part of the orbit surface (1c) to house the rotational orbit member (7). The outer circumferential surface of the inner ring (1) provides two shoulder (1b) of the orbit surface (1c) to support both side plane of the rolling member.

The inner ring (1) is divided into two circular ring, the first inner ring (1) and the second inner ring (1a) for easy manufacturing and assembling to house the rotational orbit member (7). They are engaged forming a concave groove (1d) to house the rotational orbit member (7) and are operated as one inner ring (1).

The first inner ring (1) has a inner circumferential surface to bind with the shaft member and one shoulder (1b) of the one side orbit surface and the one side orbit surface (1c). Forming a step, the outer circumferential surface (1d) is formed to house the rotational orbit member (7). The rotational orbit restriction cam mounting hole (1e)(six for example) is arranged in a circumferential shape along the outer circumferential surface (1d) to restrict the rotational orbit member (7). The outer circumferential surface (1d) is extended in axial direction to form the three binding groove (1f) in concavo-convex shape and the three binding groove (1f) is used to engage the control member (3), having a rotational direction gap. One of the three binding groove (1f) is deeper to provide the key groove which is used to make the rotational orbit intermediate recovering spring (9) engage with the second inner ring (1a). The inner circumferential surface of the second inner ring (1) has a short-radius circumference surface and a long-radius circumference surface (1). The short inner circumferential surface of the first inner ring (1) forms a spline for polygonal binding with the shaft member without any rotational direction gap and the inner circumferential surface (1g) of the first inner ring (1) forms a spline (1g) for transmitting the torque and is polygonally engaged with the control member (3), having the rotational direction gap. A stepped groove (1i) for the snap ring (22) is also formed on the outer circumferential surface of the protrusion extended from the outer circumferential surface (1d) in the direction parallel to the centric axis.

The rotational orbit member is arranged so that its inner circumferential surface is contact-rotatable with the outer circumferential surface (1d) of the first inner ring (1). The rotational orbit restriction cam engaging groove (7a) which is engraved in the direction parallel to the centric axis is made on the inner circumferential surface of the rotational orbit member (7) and which corresponds to the rotational orbit restriction cam mounting hole (1e). A concave groove (7b) is formed on the inner circumferential surface of the rotational orbit member to house the rotational orbit intermediate recovering spring (9) which is formed by folding the thin plate. Using this rotational orbit intermediate recovering spring, the rotational orbit member (7) is engaged with the inner ring (1) in the rotational direction. The radius of the outer circumferential surface (7c) of the rotational orbit member (7) is formed shorter than the radius of the orbit surface (1c) of the inner ring (1) so that the rotational orbit member (7) can not contact the rolling members (4).(d1)

The rotational orbit restriction cam (8) is a roller arranged in the direction parallel to the centric axis. The rotational orbit restriction cam (8) housed in the rotational orbit restriction cam mounting hole (1e) of the first inner ring (1) is movable in the direction vertical to the centric axis, but fixed in the rotational direction and in the direction parallel to the centric axis. Because the diameter of the rotational orbit restriction cam (8) is larger than the depth of the rotational orbit restriction cam mounting hole (1e), the rotational orbit restriction cam is protruded at least into either the rotational orbit restriction cam guide groove (3c) or the rotational orbit restriction cam engaging groove (7a) of the rotational orbit member (7).

The outer circumferential surface of the second inner ring (1a) has the shoulder (1b) of the other side orbit surface and the other side orbit surface (1c) and the side of the second inner ring (1a) provides a side wall of the groove to house the rotational orbit member. The inner circumferential surface of the second inner ring (1a) contacting the outer circumferential surface (1d) of the first inner ring (1) is restricted to the first inner ring (1) by the key groove (i) and the key (14). The three protrusion (1k) is equidistantly arranged on the outer side plane of the second inner ring (1a) for the operating surface (1l) of the wedge ring restriction cam (13). The groove is engraved in the direction parallel to the tangent line to the outer circumferential surface of the second inner ring (1a) on the outer circumferential surface of the protrusion. This groove provides the operating surface (1l) on which the wedge ring restriction cam is inserted and restricted to the wedge ring (5). The both rotational direction terminal (1m) of the protrusion (1k) provides the wall which supports the control member intermediate recovering spring (12) and pressures the control member intermediate recovering spring (12).

The control member (3) is consisted of the first control member (3) and the second control member (3a) and they are engaged and operated as one control member (3) in the present best mode. The first control member (3) has a key groove to make the control member engage with the neighboring member for transmitting the torque. The binding groove (3f) of the first control member (3) is formed to engage the second control member (3a). The three spline (3b) is arranged on the outer circumferential surface of the first control member (3). The first control member (3) contacts the first inner ring (1) to transmit the torque, having the rotational direction gap. Each spline is restricted to the inner circumferential surface (1g) of the first inner ring (1) to transmit the torque, having the rotational direction gap. The rotational orbit restriction cam guide surface (3c) is a part of plane of each spline (3b). The rotational orbit restriction cam engaging groove (3c) corresponding to the rotational orbit restriction cam mounting hole (1e) is also formed on each spline (3b).

The second control member (3a) surrounds the three protrusion (1k) of the second inner ring (1a) which provides the operating surface for the wedge ring restriction cam (13). The wedge ring restriction cam control protrusion (3d,3e) is formed from the second control member (3a) and guides the location of the wedge ring restriction cam (13a,13b) in the rotational direction. The second control member (3a) is fixedly bound to the first control member (3) by the three protrusion (3h) protruded from the second control member (3a) in the centric direction. The both terminal (3i) of the protrusion in the rotational direction contacts the control member intermediate recovering spring (12) and pressures the control member intermediate recovering spring (12) so that the control member is in the intermediate position.

The wedge ring restriction cam (13) is a cylindrical roller. The two wedge ring restriction cam (13a,13b) is pressurized in both rotational direction by the wedge ring restriction cam spring (11) which is formed by folding the thin plate. The wedge ring restriction cam (13) is located between the operating surface (11) of the wedge ring restriction cam and the hanging ring (5e) of the wedge ring preparing for the insertion and restriction. The wedge ring restriction cam control protrusion (3d,3e) makes the wedge ring not contact the wedge ring restriction cam (13) by d4 apart, pressuring the wedge ring restriction cam (13) in the intermediate position: the rotational direction gap is the same in both directions. But when the rotational direction gap is oriented in a certain direction, after the wedge ring restriction cam control protrusion pressures the one wedge ring restriction cam (13a), the one wedge ring restriction cam (13a) in turn pressures the wedge ring restriction cam spring (11) and pressures the other wedge ring restriction cam (13b).

All of the first inner ring (1), the second inner ring (1a), the first control member (3) and the second control member (3a) are not movable in an axial direction and are not separated because the snap ring (22) makes the first inner ring (1) bind with the second control member (3a).

The rolling members (4) (ten for example) are a roller arranged between the inner ring (1) and the outer ring (2). The each roller (4) is arranged in an equidistant pocket (6a) (ten for example) on the cage (6) in which the roller (4) is housed, with the roller relatively not movable with respect to the cage (6). The roller is operated contact-rotatably with the orbit surface (1c). The rotational axis of the roller is parallel to the centric axis of the assembly.

The cage (6) has ten equidistant square through pockets (6a) to house the rolling members and has ten horizontal member (6b) between the pockets in a circular form. It is located between the inner ring (1) and the outer ring (2). The roller is installed contact-rotatably with the orbit surface (1c). The horizontal member (6b) has two square through pocket (6c) facing the wedge ring in which the character-U type wedge ring intermediate recovering spring (10) is arranged to make the cage engage elastically with the wedge ring (5).

The wedge ring (5) which is formed circularly by folding the thin plate has ten pockets (5f) to house the ten rollers and ten horizontal members (5b). The rotational direction wedge (5a) is formed near to the rotational orbit member (7) which provides the wedging function in both directions. The middle part of the horizontal member (5a) is protruded and skewed to the rotational direction for easy insertion and restriction with the rotational orbit member (7). The protrusion (5d) is also formed protruded near to the cage from the two through pocket (5c) on the horizontal member (5b) of the wedge ring (5). Two character-U type wedge ring intermediate recovering spring (10) is arranged through the pocket (5c) and the pocket (6c) to make the wedge ring (5) elastically engage with the cage (6) and provides the intermediate position which permits the rotation of the roller. The horizontal member (5b) of the wedge ring (5) has the rotational direction wedge (5a) in both rotational direction which is inserted and restricted to the rotational orbit member (7) because the rotational direction wedge (5a) is elastically deformed by the roller between the rotational orbit member and the roller when the wedge ring rotates relatively with respect to the cage (6).

One circumferential surface of the wedge ring (5) which links the horizontal members (5b) provides the cam operating surface for the wedge ring restriction cam which is operated when the wedge ring engages with the inner ring. The circular hanging ring (5e) supports the cam operating surface to prevent the deformation of the rotational direction wedge which can be caused by the pressure of the wedge ring restriction cam (13).

The second rotation member is located on the outer ring (2) of the assembly. The inner circumferential surface of the outer ring (2) provides the orbit surface (1c) contacting the roller and two shoulder to support the side surface of the roller. The key groove (19a) is formed on the outer circumferential surface for either engaging with the fixed axis like a housing (19) or with the rotational resistance applying means to provide the rotational resistance.

The FIG. 11 shows the best mode of the inner-ring control type reverse input locking clutch bearing assembly which is installed on the transmission or the motor. Because the output axis is locked to the housing, the back drive input from the output axis is not transmitted to the driving axis. In this case, the side surface of the inner ring (1) is protruded to form an output side axis and the control member (3) is engaged to the driving axis (100) and the outer ring (2) is bound fixedly to the housing (19).

As shown FIG. 9b and FIG. 10b, when the torque of the control member (3) which is rotating counterclockwise is large enough, if the rotational resistance of the inner ring (1) is larger than the prefixed torque of the control member intermediate recovering spring (12), the control member intermediate recovering spring (12) is pressured by the counterclockwise torque and the control member (3) rotates relatively to the inner ring (1). If the control member (3) starts to rotate counterclockwise relatively to the inner ring, the rotational orbit restriction cam guide surface (3c) guides the rotational orbit restriction cam (8) to the rotational orbit engaging groove (7a) and makes the rotational orbit restriction cam (8) engage with the rotational orbit engaging groove (7a); thus, the rotational orbit member engages with the inner ring (1). At the same time, the wedge ring restriction cam control protrusion (3e) pressures counterclockwise the wedge ring restriction cam (13b) and also pressures the wedge ring restriction cam spring, which pressures the wedge ring restriction cam (13a) located in the counterclockwise direction and makes it (13a) be in the position preparing to be inserted and restricted to the wedge ring (5).

When the control member intermediate recovering spring (12) is pressured to the counterclockwise enough to deform, the rotational direction gap (counterclockwise) disappears and the other rotational direction gap (clockwise) becomes maximized (d3).

When the torque transfer surface of the inner ring and the control member (1g+,3b−) are met, the torque of the control member (3) (the driving axis) is transmitted to the inner ring and both the control member (3) and the inner ring rotate together counterclockwise.

The roller (4) rotates led by the inner ring (1). The cage (6) surrounding the roller (4) also begins to rotate to the rotational direction of the inner ring (counterclockwise) but rotates relatively slow to the inner ring (1). AT the same time, the wedge ring (5) interlocked with the cage (6), also rotates relatively slow to the inner ring (1).

The relatively slow rotation of the wedge ring to the inner ring (1) seems to the wedge ring restriction cam (13a) the relative clockwise rotation of the wedge ring (5).

This relative clockwise rotation does not allow the wedge ring restriction cam (13a) to be inserted and restricted to the cam operation surface of the wedge ring. As the torque pressuring to the wedge ring (5) by the wedge ring restriction cam (13a) is not enough for the wedge ring intermediate recovering spring to deform, the cage (6) still interlocks the wedge ring (5), rotating together; the rotational direction wedge of the wedge ring (5) can not contact with the rolling member. The inner ring (1) and the control member (3) of the reverse input locking clutch bearing assembly supported by the roller (4) functions as a bearing and the inner ring (1) rotates continuously led by the control member (3). It means that the input torque transmitted to the output axis.

But as shown FIG. 9c and FIG. 10c, when the torque of the inner ring (1) rotating counterclockwise is larger than the torque of the control member, if the rotational resistance of the control member (3) over the inner ring (1) to which the counterclockwise back drive is input surpasses the prefixed torque of the control member intermediate recovering spring (12), the control member intermediate recovering spring is deformed by the rotational resistance force. The inner ring (1) rotates relatively to the control member (3). If the inner ring (1) begins to rotate relatively to the control member (3), the rotational orbit restriction cam guide surface (3c) guides for the rotational orbit restriction cam to engage with the rotational orbit engaging groove (7a) and makes the rotational orbit member engage with the inner ring (1). At the same time, the wedge ring restriction cam control protrusion (3d) pressures the wedge ring restriction cam (13a) and the wedge ring restriction cam spring (11) to the clockwise direction and makes the other wedge ring restriction cam (13b) be in the position preparing to be inserted and restricted to the wedge ring (5). The roller (4) begins to rotate together with the inner ring (1), which causes the cage surrounding the roller to rotate to the rotational direction (counterclockwise) of the inner ring. The cage (6) rotates relatively slowly to the inner ring, though rotating. The wedge ring (5) interlocked together with the cage (6), also rotates relatively slowly to the inner ring (1). The relatively slow rotation of the wedge ring to the inner ring (1) seems to the wedge ring restriction cam (13b) the relative clockwise rotation of the wedge ring (5). This clockwise rotation causes the wedge ring restriction cam to be in the insertion and restriction position with the inner ring (1) and the wedge ring rotates led by the inner ring (1). As a result, the wedge ring (5) becomes to rotate more quickly than the cage (6). The wedge ring intermediate recovering spring (10) also becomes deformed by the torque of the wedge ring (5) which is inserted and restricted to the inner ring (1) and the wedge ring restriction cam (13b). The rotational direction wedge (5a) of the wedge ring (5) contacts the roller (4) and the roller climbs the rotational direction wedge (5a) on the rotational orbit restriction member, coming to the insertion and restriction position with the roller, the rotation direction wedge (5a) and the rotational orbit member (7). As the rotational orbit member is already restricted to the inner ring (1) by the rotational orbit restriction cam (8), the inner ring (1)/the rotational orbit member (7)/the rotational direction wedge (5a)/the roller (4)/ the outer ring (2) are altogether engaged to make a single body. The reverse input locking clutch bearing assembly functions as a clutch to the back drive. Because the outer ring (2) is fixed to the housing, the inner ring (1) is locked by the housing; therefore, the counterclockwise rotational back drive is prevented.

With the result that the inner ring (1) is locked by the outer ring (2) because the counterclockwise torque of the inner ring surpasses the counterclockwise torque of the control member, the inner ring (1) slows down and at any moment the counterclockwise torque of the control member (3) surpasses the counterclockwise torque of the inner ring (1). The rotational direction gap between the inner ring (1) and the control member (3) passes through the intermediate position and the other side splined plane (1g–,3b+) are met (FIG. 9c->FIG. 9a->FIG. 9b, FIG. 10c->FIG. 10d->FIG. 10b). In this process, the rotational orbit restriction cam guide surface (3c) of the control member (3) provides a space for the rotational orbit restriction cam (8) to get out of the rotational orbit engaging groove (7a). The rotational orbit member (7) becomes in a rotatable state. At the same time, the wedge ring restriction cam control protrusion (3e) pressures the wedge ring restriction cam (13b) and the wedge ring restriction cam (13b) releases the insertion and restriction of the wedge ring (5) with the inner ring (1); thus the wedge ring (5) is separated from the inner ring (1). The elastic recovering force of the wedge ring intermediate recovering spring (10) is pressured to the roller (4) which is restricted to the rotational direction wedge (5a) and the rotational orbit member (7). As the rotational orbit member is already in the rotatable position, it is rotated by the recovering force of the wedge ring intermediate recovering spring (10) and pressures the rotational orbit intermediate recovering spring (9) to deform; therefore, all of the inner ring (1)/the rotational orbit member (7)/the rotational direction wedge (5a)/the roller (4)/the outer ring (2) are released from the insertion and the restriction position. The rotational orbit member (7) in turn returns to the intermediate position by the rotational orbit intermediate recovering spring (9). As the wedge ring (5) returns to the intermediate position to the cage (6), the wedge ring (5) does not contact the roller and the roller (4) becomes rotatable. Next the control member (3) transmits the torque to the inner ring (1) and rotates together. It means the reverse input locking clutch bearing assembly functions as a bearing.

When the inner ring (1) is locked with the outer ring (2) by the counterclockwise rotation of the inner ring (1), if the clockwise rotation of the control member (3) by the driving axis (100) pressures the control member intermediate recovering spring (12) to deform and the rotational direction gap disappears, the torque transfer surface of the inner ring and the control member (1g–, 3b+) are met. The torque of the control member (3) is transmitted to the inner ring (1). The cage (6) surrounding the roller also rotates clockwise.

As the speed of the inner ring (1) which rotates together with the control member (3) is faster than the speed of the wedge ring (5) which is inserted and restricted to the roller, the roller (4) rotates clockwise led by the inner ring (1) and climbs down the rotational direction wedge (5a), which makes the wedge ring (5) release the insertion and restriction with the roller (4) and the rotational orbit member (7). The wedge ring (5) rotates relatively slowly (clockwise) to the inner ring (1). The relatively slow rotation of the wedge ring to the inner ring (1) seems to the wedge ring restriction cam (13b) the relative counterclockwise rotation of the wedge ring (5). This relative counterclockwise rotation of the wedge ring release the restriction with the wedge ring restriction cam (13b). The insertion and restriction of the roller is easily released regardless of the position of the rotational orbit restriction cam (8) and the wedge ring restriction cam (13b); therefore the wedge ring (5) returns to the intermediate position by the wedge ring intermediate recovering spring (10). The control member (3) rotates together with the inner ring (1), which means the torque is transmitted to the output side. The reverse input locking clutch bearing assembly functions as a bearing.

When the relative torque of the control member (3) to the inner ring (1) is below the prefixed torque of the control member intermediate recovering spring (12), the control member intermediate recovering spring (12) can not be deformed and the rotational direction gap is in the intermediate position in both directions. As the rotational orbit restriction cam (8) in the rotational orbit restriction cam mounting hole (1e) can be movable between the rotational restriction cam engaging groove (7c) and the rotational orbit restriction guide surface (3c), the rotational orbit member (7) can become rotatable according to the given rotational direction. At the same time, though the wedge ring restriction cam control protrusion (3d) makes the wedge ring restriction cam (13) not be inserted and restricted to the wedge ring (5); so, the wedge ring (5) rotates led by the cage (6) without any rotational resistance. The torque between the inner ring (1) and the control member (3) is reversibly transmitted, with the control member being in the intermediate position. Therefore the reverse input locking clutch bearing assembly functions as a bearing. (This function is applied to the power assistance steering device of the vehicle and the kick back prevention device). Despite the back drive below the prefixed torque of the control member intermediate recovering spring (12) can be inputted from the output side, the torque from the input side can be transmitted to the output side. But without the control member intermediate recovering spring (12), the back drive can not be permitted.

Other examples of the assembly include folding devices (such as a bed, a seat or the joints of a robot) which generate an angular displacement, raising and lowering devices (such as an elevator, a screw jack, or the window glass in a vehicle) which generate a rotational movement, opening and closing devices (such as a door, a shutter, a sunroof, or an electric sliding door) which generate a linear displacement, and the rotational devices (such as an electric power steering device, the kick back prevention steering device, a bicycle sprocket, an electric wheel chair, or the rear wheels of a vehicle with four wheel steering which uses a ball screw).

FIG. 12 shows an example that the above mentioned assembly is applied to the hybrid cart which uses either the electric power or the man power. When the cart is operated, the wheel rotates idly to the back drive input from the wheel.

The driving axle (31) transmitting the torque of the power assistance motor (M) is supported by the bearing (37) on the cart body. The control member (3) is not contacting the driving axle (31) and the character C shaped control member rotational resistance protrusion (3k) is protruded paralleled to the axis from the second control member (3a). The sliding surface (36a) providing the rotational resistance is installed on housing (36) which is installed fixedly to the cart body by the bolt. The elastic recovering force of the sliding spring is pressured outwardly to the housing (36) and both terminal (15a,15b) of the sliding spring is protruded to the centric direction of the driving axle. The sliding spring provides the rotational resistance to the control member, having a rotational direction gap between both terminal (15a,15b) of the sliding spring and the control member rotational resistance protrusion (3k). The inner ring (1) is fixed to the driving axle (31). The one side of the wheel hub (33) is fixed to the outer ring (2) of the assembly and the other side of the wheel hub (33) is supported by the bearing (38) on the driving axle (31).

As shown FIG. 9c and FIG. 10c, when the counterclockwise torque of the inner ring (1) which is fixed to the driving axle is large enough to the rotational resistance torque of the control member (3), if the rotational resistance torque from the sliding spring (15) over the inner ring (1) surpasses the prefixed torque of the control member intermediate recovering spring (12), the control member intermediate recovering spring (12) is deformed so that the inner ring (1) rotates relatively to the control member (3). As the inner ring (1) begins to rotate counterclockwise relatively, the control member rotational resistance protrusion (3k) contacts the terminal (15b) of the sliding spring. The rotational orbit restriction cam guide surface (3c) of the control member which receives the rotational resistance torque from the sliding spring (15) guides the rotational orbit restriction cam (8) to the rotational orbit restriction cam engaging groove and the rotational orbit restriction cam (8) makes the rotational orbit member (7) engage with the inner ring (1). At the same time, the wedge ring restriction cam control protrusion (3d) pressures the wedge ring restriction cam (13a) to the clockwise direction and the wedge ring restriction cam spring (11) also pressures the other wedge ring restriction cam (13b), which makes (13b) be in the position preparing to be inserted and restricted to the wedge ring (5). The roller (4) rotates led by the inner ring (1). The cage housing the roller (4) rotates the same direction of the inner ring (1) but relatively slowly. The wedge ring (5) which rotates together with the cage (6) also rotates relatively slowly to the inner ring. This relative slow counterclockwise rotation of wedge ring seems to be the clockwise rotation to the wedge ring restriction cam (13b); so, the wedge ring (5) is inserted and restricted to the inner ring (1) and rotates together.

When the control member intermediate recovering spring (12) is pressured enough to make the rotational direction gap disappear, the torque transfer surface (1g−,3b+) of the inner ring (1) and the control member (3) are met. The control member rotates counterclockwise together with the inner ring (1) (driving axle). Next the control member rotates receiving the rotational resistance torque of the sliding spring (15). In the consequence, the wedge ring (5) rotates counterclockwise faster than the cage (6). The torque by the wedge ring restriction cam (13) pressures the wedge ring intermediate recovering spring (10), with the wedge ring (5) rotating relatively to the cage (6). Then the rotational direction wedge (5a) of the wedge ring contacts the roller (4) and the roller (4) climbs the rotational direction wedge (5a) on the rotational orbit member (7) to be inserted and restricted to the rotational orbit member (7). As the rotational orbit member is already restricted to the inner ring (1) by the rotation orbit restriction cam (8), the inner ring (1)/the rotational orbit member (7)/the rotational direction wedge (5a)/the roller (4)/the outer ring (2) are altogether engaged to make a single body; thus, the torque from inner ring (1) is transmitted to the outer ring (2) and rotates together. the torque from driving axle (31) is transmitted to the wheel hub (33). It means that the reverse input shutoff clutch bearing assembly functions as the clutch.

Under the situation the torque from the inner ring (1) is transmitted to the outer ring, as shown FIG. 9e and FIG. 10e, if the outer ring (2) rotates counterclockwise faster than the inner ring (1) because the torque of the inner ring (1) decreases or the back drive is added to the outer ring (2), the outer ring (1) rotates faster than the wedge ring (5) which is inserted and restricted to the inner ring (1). The wedge ring (5)

rotates relatively slowly (counterclockwise) to the outer ring (2). The roller (4) rotates counterclockwise led by the outer ring (2) and climbs down the rotational direction wedge (5a), which makes the wedge ring (5) release the insertion and restriction with the roller (4) and the rotational orbit member (7). The relatively slow rotation of the wedge ring to the outer ring (2) seems to the wedge ring restriction cam (13b) the relative counterclockwise rotation of the wedge ring (5). This relative counterclockwise rotation of the wedge ring makes the wedge ring restriction cam (13b) release the restriction with inner ring (1). The insertion and restriction of the roller is easily released regardless of the position of the rotational orbit restriction cam (8) and the wedge ring restriction cam (13b). The wedge ring (5) inserted and engaged by the wedge ring restriction cam returns to the intermediate position and rotates led by the cage (6). This time, the wedge ring (5) rotates relatively counterclockwise for the wedge ring restriction cam (13b) to release the insertion and restriction with inner ring (1). The wedge ring (5) rotates led the cage (6) without any rotational resistance torque; so, the outer ring (2) which rotates faster than the inner ring (1) rotates idly.

Under the situation the torque from the inner ring (1) is transmitted to the outer ring (2), as shown FIG. 9e and FIG. 10e, if the outer ring (2) rotates clockwise because more torque is added to the outer ring (2), the rotational speed of the inner ring (1) is gradually decreased and inner ring (1) stops. Though the control member (3) which has provided the rotational resistance torque to the inner ring (1) rotates led by the inner ring (1), the control member (3) also gradually decrease the speed and stops. When the control member stops, the outer ring (2) pressures the inner ring (1), which means the inner ring (1) rotates clockwise until the rotational direction gap between the control member (3) and the inner ring (1) arrives the intermediate position. The rotational direction gap between the sliding spring and the control member rotational resistance control protrusion, of course, also becomes open but the other side of the torque transfer surface of the control member and the inner ring (1g+,3b−) can not be met. Because the rotational direction gap is in the intermediate position, the rotational orbit restriction cam guide surface (3c) of the control member (3) provides a space for the rotational orbit restriction cam (8) to get out of the rotational orbit engaging groove (7a). The rotational orbit member (7) becomes rotatable state. Next the wedge ring restriction cam control protrusion (3d) pressures the wedge ring restriction cam (13) to release the insertion and restriction of the wedge ring (5) with the inner ring (1). So the wedge ring (5) is separated from the inner ring (1). The elastic recovering force of the wedge ring intermediate recovering spring (10) pressures the roller (4) which is restricted to the rotational direction wedge (5a) and the rotational orbit member (7). As the rotational orbit member is already in the rotatable position, it is rotated by the elastic recovering force of the wedge ring intermediate recovering spring (10). As a result, all of the inner ring (1)/the rotational orbit member (7)/the rotational direction wedge (5a)/the roller (4)/the outer ring (2) are released from the insertion and the restriction position. The rotational orbit member (7) in turn returns to the intermediate position by the rotational orbit intermediate recovering spring (9). As the wedge ring (5) returns to the intermediate position to the cage (6) and does not contact, the roller (4) becomes rotatable. The outer ring (2) is separated from the inner ring (1). Though the inner ring (1) rotate counterclockwise, the outer ring (2) rotates clockwise regardless of the rotational direction of the inner ring (1). The inner ring (1) rotates counterclockwise and even though the inner ring (1) engages with the outer ring (2) temporarily, the torque of the outer ring (2) can not be transmitted to the inner ring (1) and this process is repeated due to the clockwise rotation of the outer ring (2). It means that even if the cart is moved to the direction contrary to the rotational direction of the driving axle, the back drive is not permitted to the driving axle. The reverse input prevention shutoff clutch bearing assembly functions as a bearing.

When the inner ring rotates, if the rotational resistance torque provided to the control member is below the prefixed torque of the control member intermediate recovering spring (12), the control member intermediate recovering spring is not deformed. The control member rotates led by the inner ring (1). The assembly functions as a bearing because the wedge ring restriction cam does not work. The torque of the inner ring cannot be transmitted to the outer ring (2) and the outer ring (1) rotates idly.

When the torque below the prefixed torque of the control member intermediate recovering spring (12) is inputted to the inner ring (1) from the driving source, if the rotational resistance of the control member is larger than the torque from the driving axle, the control member intermediate recovering spring (12) is not deformed and the inner ring can not be rotated by the rotational resistance torque. The assembly functions as a bearing and the outer ring rotates idly.

The reverse input shutoff clutch bearing assembly is applied to devices having the two-driving source (such as a automatic door system, a electric assistant cart, a electric assistant man powered driving vehicle, a hybrid engine) which is usually operated by the electric power but occasionally operated by the manpower due to the power failure, free rotational devices (such as a washing machine, a paper-feeding device of the copy machine) which needs the free rotation of the output side, or the shock protection devices (such as a side rear mirror of the vehicle, a closing and opening device of the electric window, a torque limiting device).

FIG. 14 shows the best mode that the inner-ring control type assembly is applied to the torque transmission clutch unit. This assembly functions as a clutch to transmit the torque reversibly between the inner ring (1) and outer ring (2) when the control member (3) is restricted to the outer ring (2) by the rotational resistance torque. This assembly also functions as a bearing for the inner ring (1) and the outer ring (2) to freely rotate, respectively, when the control member (3) is separated from the outer ring (2).

The inner ring (1) is bound to the driving axle (41) and rotates together. The saw-toothed wheel is formed on the outer circumferential surface of the outer ring and is meshed with the corresponding gear and turns around.

The protrusion (42) extended from the side surface of the outer ring toward the side surface of the control member (3) is formed and the frictional panel (43) which moves paralleled to the centric axis rotates along the protrusion (42). The brake lining (16) is bound to the frictional panel to the control member direction and is opposed to the side surface of the control member. The actuator is installed to pressure the frictional panel (43) so that the brake lining (16) engages and disengage with the side surface of the control member (3).

When the rotational resistance torque of the inner ring (1) and outer ring (2), respectively, is below the rotational friction resistance torque occurred between the outer ring and the control member (3), the torque of the inner ring (1) is transmitted to the control member (3) through the torque transmission surface and is transmitted to the outer ring (2) through the rotational friction resistance torque. The torque of the outer ring (2) is also transmitted to the control member (3) through the rotational friction resistance and is transmitted to the inner ring (1) through the torque transmission surface.

When the difference of the torque between the inner ring (1) and the outer ring (2) is larger than the rotational friction resistance torque between the outer ring and the control member (3), if the outer ring stops and the inner ring (1) rotates, the control member (3) also stops due to the rotational friction resistance torque between the control member and the outer ring (2). Then the inner ring (1) rotates relatively to the control member (3). As shown FIG. 9c and FIG. 10c, if the inner ring (1) begins to rotate relatively to the control member (3), the rotational orbit restriction cam guide surface (3c) guides the rotational orbit restriction cam to engage with the rotational orbit engaging groove (7a) and the rotational orbit restriction cam makes the rotational orbit member engage with the inner ring (1). At the same time, the wedge ring restriction cam control protrusion (3d) pressures the wedge ring restriction cam (13a) and the wedge ring restriction cam spring (11) to the clockwise direction and makes the other wedge ring restriction cam (13b) be in the position preparing for the insertion and the restriction with the inner ring (1). The roller (4) begins to rotate together led by the inner ring (1), which causes the cage (6) surrounding the roller to rotate to the rotational direction of the inner ring (1). The cage (6) rotates relatively slowly to the inner ring, though rotating. The wedge ring (5) rotating together with cage (6) also rotates relatively slowly to the inner ring (1). Though this relatively slow rotation of the wedge ring to the inner ring (1) seems the relative clockwise rotation of the wedge ring (5) to the wedge ring restriction cam (13b), the wedge ring (5) is inserted and restricted to the inner ring (1) and rotates together with the inner ring (1). Then, the other side torque transfer surface of the inner ring (1) and the control member (3) (1g−,3b+) are met and the control member (3) rotates together counterclockwise led by the inner ring (1) (driving axis). This time, the control member (3) rotates receiving the continuous rotational resistance torque of the outer ring (2).

As a result, the wedge ring (5) begins to rotate more quickly counterclockwise than the cage (6). The wedge ring intermediate recovering spring (10) also becomes deformed by the torque inputted from the inner ring (1). The rotational direction wedge (5a) of the wedge ring (5) contacts the roller (4) and the roller climbs the rotational direction wedge (5a) on the rotational orbit member, coming to the insertion and restriction position with the roller (4), the rotational direction wedge (5a) and the rotational orbit member (7). As the rotational orbit member is already restricted to the inner ring (1) by the rotational orbit restriction cam (8), the inner ring (1)/the rotational orbit member (7)/the rotational direction wedge (5a)/the roller (4)/the outer ring (2) are altogether engaged to make a single body. The torque of the inner ring is transmitted to the outer ring and rotates together. The assembly functions as the clutch.

Under the situation the torque from the inner ring (1) is transmitted to the outer ring (2), as shown FIG. 9e and FIG. 10e, if the outer ring (2) rotates counterclockwise because more torque is added to the outer ring (2), the rotation of the outer ring (2) is faster than the rotation of the wedge ring (5) which is inserted and restricted to the inner ring (1). Then the rotational direction of the roller (4) by the outer ring (2) becomes contrary to the rotational direction of the rotational direction wedge (5a). The rotational direction insertion and the restriction of the roller (4) is easily released regardless of the position of the rotational orbit member restriction cam (8) and the wedge ring restriction cam (13); so, the two-way clutch assembly functions temporarily as a bearing. The inner ring (1) rotates in the given speed regardless of the outer ring (2).

At the same time, as the control member (3) which is restricted to the outer ring (2) by the frictional resistance torque and which is rotated led by the outer ring (2) rotates faster than the inner ring, the control member (3) passes through the intermediate position and the torque transfer surface of the inner ring and the control member (1g+,3b−) are met. The rotational orbit restriction cam guide surface (3c) of the control member guides the rotational orbit restriction cam (8) to the rotation orbit restriction cam engaging groove (7a) to engage the rotational orbit member (7) with the inner ring (1). Next the wedge ring restriction cam control protrusion (3e) pressures the wedge ring restriction cam (13b) counterclockwise and makes the other wedge ring restriction cam (13a) be in the position preparing for the insertion and the restriction with the inner ring (1).

Next when the rotational direction gap disappears, the torque transfer surface of the inner ring and the control member (1g+,3b−) are met and the control member (3) rotates led by the inner ring (1). But the roller (4) rotates led by the outer ring (2). The cage surrounding the roller (4) rotates the same direction of the outer ring (2) but rotates relatively faster than the inner ring (1). The wedge ring (5) which rotates together with the cage (6) rotates relatively fast to the inner ring, which seems to be the clockwise rotation to the wedge ring restriction cam (13). This relative clockwise rotation makes the wedge ring (5) be inserted and restricted to the inner ring (1) and rotates together.

As the wedge ring (5) rotates relatively slow to the roller (4), the roller climbs the rotational direction wedge (5a) on the rotational orbit member (7) and is inserted and engaged with the wedge ring and the rotational orbit member. As the rotational orbit member is already restricted to the inner ring (1), the outer ring (2)/the roller (4)/the rotational direction wedge (5a)/the rotational orbit member (7)/the inner ring (1) are altogether engaged to make a single body and the torque from the outer ring (2) is transmitted to the inner ring (1) and rotates together. It means that the assembly functions as the clutch and transmits the torque.

As explained above, when the control member (3) receives the rotational resistance torque from the inner ring, the assembly functions as a two-way clutch. But if the rotational resistance applying means between the control member (3) and the outer ring (2) is separated and the control member does not receive the rotational resistance torque, the control member (3) returns to the intermediate position by the control member intermediate recovering spring. Then the assembly functions as the bearing and the torque transmission is cut. A small torque switch which controls the rotational resistance torque can leverage the large torque transmission. The two-way clutch assembly is applied to the torque transmission clutch, a limit slip differential (LSD) of the vehicle, a center differential (CD), a dog-clutch transmission.

FIG. 15 shows that the inner-ring control type assembly which can choose the direction of the torque transmission is applied to the one-way clutch unit. This one-way clutch bearing assembly is located and operated between the inner ring (1) and the outer ring (2) when the control member (3) engages with the inner ring (1) by using the ball plunger.

The three plunger as the restraining means is installed and makes the control member maintain the rotational direction gap in the prefixed position over the inner ring (1). The closed hole (51) which is drilled on the convex part of the control member, the spring (52) which is inserted into the closed hole (51), and the ball (53) which is also inserted into the hole (51) and supported by the spring (52) are installed. The three concave guide groove (54a,54b,54c) which the ball (53) protruded by the spring (52) is inserted into is arranged on the concave part of the inner ring (1) correspondingly to the closed hole (51). One of the guide groove (54a) exists for the rotational direction gap to be in the intermediate position in both directions. The other guide groove (54b) exists for the rotational direction gap to be in the clockwise inclined position. The last guide groove (54c) exists for the rotational direction gap to be in the counterclockwise inclined position.

When the ball plunger engages the guide groove (54a) in the intermediate position, as shown FIG. 9a and FIG. 10a, the rotational orbit member (7) is not affected by the rotational orbit restriction cam (8). Because the wedge ring restriction cam control protrusion (3d,3e) pressures the both wedge ring restriction cam (13a,13b) not to contact the wedge ring (5), the wedge ring (5) rotates together with the cage (6). As the roller (4) rotates idly, so the inner ring (1) and the outer ring (2) functions as the bearing.

When the ball plunger engages the guide groove (54b) in the clockwise inclined position, as shown FIG. 9c and FIG. 10c, the torque transfer surface of the control member and the inner ring (1g−,3b+) is determined. The one-way clutch functions as the clutch to the counterclockwise rotation of the inner ring (1) and functions as the bearing to the clockwise rotation of the inner ring (1). The one-way clutch functions as the clutch to the clockwise rotation of the outer ring (2) because the roller (4) rotates to the direction which makes the roller climb the rotational direction wedge and the rotational orbit member is already restricted to the inner ring (1) but it functions as the bearing to the counterclockwise rotation of the outer ring (2), as shown FIG. 9e and FIG. 10e.

When the ball plunger engages the guide groove (54c) in the counterclockwise inclined position, as shown FIG. 9b and FIG. 10b, the torque transfer surface of the control member and the inner ring (1g+,3b−) is determined. The one-way clutch functions as the clutch to the clockwise rotation of the inner ring (1) and functions as the bearing to the counterclockwise rotation of the inner ring (1). The one-way clutch functions as the bearing to make the roller (4) rotate idly because the wedge ring (5) rotates the clockwise direction and this clockwise rotation of the wedge ring (5) makes the wedge ring restriction cam (13a) release the insertion and the restriction with the wedge ring and the inner ring (1). As the counterclockwise rotation of the outer ring (2) makes the wedge ring rotate counterclockwise, this counterclockwise rotation of the wedge ring (5) makes the wedge ring restriction cam (13a) be inserted and restricted to the wedge ring and the inner ring (1). At the same time, the roller (4) which rotates led by the outer ring (2) and which rotates faster than the inner ring (1) climbs the rotational direction wedge (5a) and the rotational orbit member (7) is already restricted to the inner ring (1); the one-way clutch functions as the clutch.

FIG. 16 shows the inner-ring control type assembly is applied to the side rear mirror of the vehicle. The gear (58) extended from the inner ring (1) is restricted to the electric motor (M) and the side rear mirror is restricted to the outer ring (2). The sliding spring (60) is installed on the car body (59) which is used for housing (59) to provide the rotational resistance torque to the control member (3). The outer ring (2) is engaged with the housing (59), using the ball plunger so that the rear mirror (57) maintains the operating position.

The plunger as the restraining means is installed so that the rear mirror (57) maintains the prefixed operating position between the outer ring (2) and the housing.

The closed hole (56) is drilled on the side surface of the outer ring (2) and the plunger spring (52) is inserted into the closed hole (56). The plunger ball (53) which is also inserted into the hole (56) and which pressures the plunger spring (52) is installed to protrude outwardly from the hole (56). The concave guide groove (55) which corresponds the closed hole (56) is arranged on the housing (59) so that the protruded plunger ball (53) anchors for the restriction.

The rear mirror is easily moved to the operating position by a small torque of the motor (M) regardless of the torque of the spring (52) before the rear mirror arrives the operating position. As explained in FIG. 12, when the motor is driven, the inner ring rotates together with the gear. As the control member receiving the rotational resistance torque by the sliding spring rotates, the inner ring and the outer ring are engaged and moved to the operating position the motor leads. The motor (M) stops at the operating position (55). The ball plunger below the prefixed torque of the plunger spring (52) is protruded to engage the housing with the rear mirror and the rear mirror operates normally. The torque which surpasses the prefixed torque of the plunger spring pressures the plunger ball (53) and the plunger ball (53) sinks to the hole (56) and pressures the plunger spring (52), which means the rear mirror left the operating position. As explained in FIG. 12, the reverse input separating function separates the motor (M) which is restricted to the inner ring from the rear mirror which is restricted to the outer ring. As the rear mirror (57) rotates idly, the rear mirror and the motor are protected from the out side shock.

All the abovementioned best mode has been explained in case the control member is located on the inner ring but the control member can be located on the outer ring, which means the outer-ring control type reverse input prevention clutch bearing assembly can be designed.

At the abovementioned mode the roller is used in the cylindrical shape. The various shape of rolling member (40) and a sphere shape also can be used. FIG. 17 has more: a spheric roller (a), cylindrical (needle) roller (b), the double-headed drum pinched in at the middle shape roller (c), etc. Each one of these roller can be used for either the roller (4) role of the bearing or the torque transfer role of the clutch.

The shape of the rotational orbit member is made variously according to the shape of the rolling member (40) shown in FIG. 17. The shape of the rotational orbit member can be designed in a trapezoid, an oval, a half-moon, a taper shape for the smoothly contact-rotatable movement of the rolling member.

The quality of the material for the rotation member, the roller, the wedge ring or the cage can be a plastic, a ceramic, a rolled steel, a enforced steel, an alloy or the combination of these material.

INDUSTRIAL APPLICABILITY

The reverse input locking clutch bearing assembly is applied to the folding devices (such as a bed, a seat or the joints of the robot) which generate an angular displacement, raising and lowering devices (such as an elevator, a jack or the window glass in a vehicle) which generate a linear displacement, opening and closing devices (such as a door, a shutter, a sunroof, an electric sliding door) and rotational devices (such as an electric power steering device, the kick back prevention steering device in a bike, a bicycle sprocket, an electric wheel chair, an electric vehicle, and the rear wheels of a vehicle with four wheel steering which uses a ball screw).

The reverse input shutoff clutch bearing assembly is applied to having the two-driving source (such as a automatic door system, a electric assistant cart, a electric assistant man powered driving vehicle, a hybrid engine) which is usually operated by the electric power but occasionally operated by the manpower due to the power failure, free rotational devices (such as a washing machine, a paper-feeding device of the copy machine) which needs the free rotation of the output side, or the shock protection devices (such as a side rear mirror of the vehicle, a closing and opening device of the electric window, a torque limiting device).

The two-way clutch bearing assembly is applied to the torque transmission clutch, a limited slip differential (LSD) of a vehicle, a center differential (CD), a dog-clutch transmission.

What is claimed is:

1. A reverse input prevention clutch bearing assembly, comprising:
   a first rotational member and a second rotational member which are arranged on a coaxial line and have orbit surfaces of different radii;
   a plurality of rolling members which are arranged in a circumferential shape so that outer surfaces of the same are in contact between the two orbit surfaces;
   a cage which supports the rolling members so that the arrangement of the rolling members is maintained;
   a control member which has a rotational direction gap with respect to the first rotational member and is engaged with the first rotational member so that the torque of both forward and reverse direction is transmitted with a delay caused by said rotational direction gap; and
   a wedge ring assembly which allows or does not allow the rolling members to rotate based on the change of the rotational direction gap and the rotational direction of the control member.

2. The assembly of claim 1, wherein said control member is engaged with an input side from which the torque is input, and said first rotational member is engaged with an output side.

3. The assembly of claim 1, wherein said first rotational member is engaged with a input side from which the torque is input, said second rotational member is engaged with a output side and forward and reverse directional torque input from the input side allows the wedge ring assembly to substantially restrict the rotation of the rolling members, so that the first rotational member and the second rotation member are engaged, and forward and reverse directional torque is transmitted to the output side, and forward and reverse directional torque input from the output side allows the wedge ring assembly the rotation of the rolling members, so that the second rotational member is separated from the first rotational member and idly rotates and the torque is not transmitted to the input side.

4. The assembly of claim 1, wherein said wedge ring assembly includes: a locking means which provides a wedging function to the rolling members when the direction of a torque transfer surface of the first rotational member contacting with the control member is the same as the rotational direction of the first rotational member.

5. The assembly of claim 1, wherein said wedge ring assembly includes:
   a rotational orbit member which is rotatably supported by the first rotational member between the orbit surface of the first rotational member and the rolling members;
   a rotational orbit restriction member which allows the rotational orbit member to relatively rotate with respect to the first rotational member as the rotational direction gap is returning to the intermediate position in both directions, and which makes the rotational orbit member to be substantially restricted by the first rotational member as the rotational direction gap is oriented in a certain direction;
   a wedge ring which is elastically engaged with the cage in the rotational direction of the same and houses the rolling members, with a rotational direction wedge being formed along a circumferential surface of the rotational orbit member for substantially restricting the rotation of the rolling members and the rotational orbit member, and with the wedge ring being designed to cooperate with the rotational orbit member; and
   a wedge ring restriction member which provides a rotational resistance torque to the wedge ring so that the wedge ring either rotates with the cage or relatively rotates with respect to the cage.

6. The assembly of claim 5, wherein said rotational orbit member includes a plurality of rotational orbit restriction cam engaging grooves which are formed along a circumference of the rotational orbit member contacting with the first rotation member.

7. The assembly of claim 5, wherein said rotational orbit restriction member includes:
   a plurality of rotational orbit restriction cam mounting holes which are formed along a circumference of the first rotational member;
   a plurality of rotational orbit restriction cam engaging grooves which are formed along a circumference of the rotational orbit member contacting with the first rotational member;
   a rotational orbit restriction cam guide surface of the control member which is formed corresponding to the rotational orbit restriction cam mounting hole and which provides a certain space in which the rotational orbit restriction cam is protruded to the control member when the rotational direction gap is in the intermediate position in both directions and which makes the rotational orbit restriction cam protrude to the restriction cam engaging groove when the rotation direction gap is oriented in a certain direction; and
   a rotational orbit restriction cam which moves along the rotational orbit restriction cam engaging groove and the rotational orbit restriction cam guide groove from the rotational orbit restriction cam mounting hole, with the rotational orbit restriction cam being protruded to at least either the rotational orbit restriction cam engaging groove or the rotational orbit restriction cam guide groove.

8. The assembly of claim 7, wherein said each restriction cam is a cylindrical roller.

9. The assembly of claim 5, further comprising a rotational orbit intermediate recovering spring by which the rotational orbit member and the first rotational member are elastically engaged and are rotated together, and when the torque larger than a certain recovering torque of the same is applied to the rotational orbit intermediate recovering spring, the rotational orbit member and the first rotational member are relatively rotated but the rotational orbit member returns to the intermediate position based on the elastic recovering torque of the same when said torque is removed.

10. The assembly of claim 5, wherein said wedge ring is formed in a circular shape and includes:
   a plurality of horizontal members which form pockets for housing the rolling members in a relative rotatable manner with respect to the cage along the circumference of the wedge ring;
   a pocket which is provided at the horizontal member for an elastic engagement with the cage;
   a rotational direction wedge which is protruded from the horizontal member in both directions toward the gap between the orbit surface of the rotational orbit member and the rolling members; and a circular hanging ring which provides an operation surface of the wedge ring restriction cam and connects the horizontal members.

11. The assembly of claim 10, wherein said wedge ring made of thin plate elastic member is formed in a circular shape and said hanging ring supports the wedge ring so that the wedge ring is not deformed when the wedge ring is inserted and engaged with the wedge ring restriction cam.

12. The assembly of claim 5, further comprising a wedge ring intermediate recovering spring by which the cage and the wedge ring are elastically engaged in the rotational direction and are rotated together, and when the torque larger than a certain elastic recovering torque of the same is applied to the wedge ring, the wedge ring is relatively rotated with respect to the cage but the wedge ring returns to the intermediate position based on the elastic recovering torque of the same when said torque is removed.

13. The assembly of claim 5, wherein said wedge ring restriction member is a two-way clutch which allows the wedge ring to keep on rotating when the wedge ring is rotated relatively with respect to the first rotational member in the direction that a torque transfer surface of the first rotational member contacting with the control member is the same as the rotational direction of the first rotational member, and which restricts the rotation of the wedge ring when the wedge ring is relatively rotated with respect to the first rotational member to the opposite direction that the torque transfer surface of the first rotational member contacting with the control member is the same as the rotational direction of the first rotational member.

14. The assembly of claim 13, wherein said two-way clutch includes:
a wedge ring restriction cam guide surface which has at the first rotational member a concave inclination surface with respect to the circumference of the first rotational member;
a wedge ring restriction cam which has a wedge function between the wedge ring restriction cam guide surface and the wedge ring;
a wedge ring restriction cam spring which provides an elastic force to pressure wedge ring restriction cam in both directions between two wedge ring restriction cams so that the wedge ring restriction cam contacts with the wedge ring restriction cam control protrusion; and
a wedge ring restriction cam control protrusion which is protruded from the control member and guides the position of the wedge ring restriction cam.

15. The assembly of claim 14, wherein said wedge ring restriction cam control protrusion contacts with the wedge ring restriction cam so that two wedge ring restriction cams are not in a insertion and restriction position in both directions when the rotational direction gap is in the intermediate position in both directions, with the wedge ring restriction cam spring pressurizing the two wedge ring restriction cam, and when the rotational direction gap is oriented in a certain direction, the wedge ring restriction cam control protrusion pressures the wedge ring restriction cam of one side so that the other wedge ring restriction cam is in the insertion and restriction position through the cam spring.

16. The assembly of claim 14, wherein said each restriction cam is a cylindrical roller.

17. The assembly of claim 13, wherein said two-way clutch includes:
a wedge ring restriction cam guide surface which has at the first rotational member a concave inclination surface with respect to the circumference of the first rotational member;
a wedge ring restriction cam which has a wedge function between the wedge ring restriction cam guide surface and the wedge ring;
a wedge ring restriction cam control protrusion which is protruded from the control member and guides the position of the wedge ring restriction cam; and
a wedge ring restriction cam spring which pressures the wedge ring restriction cam in both directions from the wedge ring restriction cam control protrusion and provides an elastic force.

18. The assembly of claim 17, wherein said each restriction cam is a cylindrical roller.

19. The assembly of claim 5, wherein said first rotational member is formed in such a manner that two circular members are engaged in an axial direction.

20. The assembly of claim 1, wherein each of said rolling members is a cylindrical roller which contacts with the orbit surfaces of the first rotational member and the second rotational member.

* * * * *